(12) United States Patent
Acharya et al.

(10) Patent No.: US 11,326,418 B2
(45) Date of Patent: May 10, 2022

(54) METHOD AND SYSTEM FOR MANAGING RECOVERY AND RE-USE OF A STIMULATING FLUID FROM A FLOWBACK STREAM

(71) Applicant: Baker Hughes Holdings LLC, Houston, TX (US)

(72) Inventors: Harish Radhakrishna Acharya, Niskayuna, NY (US); Roger Allen Shisler, Niskayuna, NY (US); Andrew Jacob Gorton, Niskayuna, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/606,414

(22) PCT Filed: Apr. 20, 2017

(86) PCT No.: PCT/US2017/028682
§ 371 (c)(1),
(2) Date: Oct. 18, 2019

(87) PCT Pub. No.: WO2018/194628
PCT Pub. Date: Oct. 25, 2018

(65) Prior Publication Data
US 2020/0056457 A1 Feb. 20, 2020

(51) Int. Cl.
*E21B 41/00* (2006.01)
*B01D 17/02* (2006.01)
(Continued)

(52) U.S. Cl.
CPC .............. *E21B 41/00* (2013.01); *B01D 17/02* (2013.01); *B01D 19/0068* (2013.01); *E21B 43/26* (2013.01)

(58) Field of Classification Search
None
See application file for complete search history.

(56) References Cited

U.S. PATENT DOCUMENTS

2009/0230059 A1   9/2009   McGuire et al.
2011/0089123 A1   4/2011   Kennedy et al.
(Continued)

OTHER PUBLICATIONS

International Search Report of the International Searching Authority for PCT/US2017/028682 dated Jan. 11, 2018.

*Primary Examiner* — Richard C Gurtowski
(74) *Attorney, Agent, or Firm* — Crowe & Dunlevy, P.C.

(57) ABSTRACT

Method includes recovering a stimulating fluid, which includes transferring working fluid having the stimulating fluid from an operating site (102) to a current temporary processing facility (TPF) (110) that is located remotely with respect to the operating site in the geographical region. After purifying the working fluid at the current TPF (110), thereby providing the stimulating fluid, the stimulating fluid is transferred from the current TPF to an injection site (103) that is located remotely with respect to the current TPF and the operating site. The method also includes transporting fluid-handling equipment after a designated condition has been satisfied. The fluid-handling equipment is transported from the current TPF (110) to a new TPF (110). The recovering of the stimulating fluid, the transferring of the stimulating fluid, and the transporting of the fluid-handling equipment is repeated a plurality of times. The current and new TPFs are at different locations within the geographical region.

7 Claims, 9 Drawing Sheets

(51) Int. Cl.
B01D 19/00 (2006.01)
E21B 43/26 (2006.01)

(56) References Cited

U.S. PATENT DOCUMENTS

| | | |
|---|---|---|
| 2012/0325751 A1 | 12/2012 | Renick et al. |
| 2013/0255941 A1 | 10/2013 | Olson et al. |
| 2015/0122498 A1 | 5/2015 | Duesel, Jr. et al. |
| 2017/0321530 A1* | 11/2017 | Gentry .................... E21B 43/26 |

* cited by examiner

METHOD AND SYSTEM FOR MANAGING RECOVERY AND RE-USE OF A STIMULATING FLUID FROM A FLOWBACK STREAM

FIELD

Embodiments disclosed herein relate generally to a system and method of managing recovery of a working fluid from a flowback stream of a post-stimulated well and transferring the working fluid to another site for re-use.

Hydraulic fracturing is a technique used to release petroleum, natural gas, or other substances within a subterranean reservoir. For example, a wellbore is drilled into an underground rock formation, and a stimulating fluid is pumped into the reservoir causing fractures to form in the rock formation, releasing trapped substances therein. After the fracturing process is complete, and some time has passed, the wellhead is opened and the pressure within the reservoir drives fluids through the hydraulic fractures, to the wellbore, and then to the surface. In some cases, injecting a stimulating fluid into a reservoir that has previously been hydraulically fractured, and has been producing fluids for some time (typically greater than 1 year) is desirable as this can help to further increase and/or accelerate hydrocarbon production from the existing well or wells.

Operations for handling the fluid stream after stimulation generally occur in three periods: a drill-out period, a flowback period, and a production period. During the drill-out and flowback period, the fluid stream (now called "flowback" or a "flowback stream") has a high and highly variable flowrate, pressure, and composition. The flowback stream contains, among other things, the stimulating fluid and hydrocarbon-containing substances. The hydrocarbon-containing substances may include at least one of a liquid (e.g., oil), condensates (e.g., natural gas liquids, such as ethane, propane, and butane), and gases (e.g., methane). After some time (e.g., one or more days), the flowback period transitions to the production period. In the production period, the fluid stream has a lower and more uniform flowrate and pressure than the flowback stream. Also, solid debris, such as sand, may be minimal. The hydrocarbon-containing substances are captured from the stream during the production period.

Injecting the stimulating fluid and handling the fluid stream can require large, complex equipment and a number of storage vessels. It is often necessary to clear an area of land to accommodate these objects. The cleared land may be referred to as a "well-pad" or "wellpad" and may include multiple wells (e.g., 2-8 wells or more).

Current fracturing systems utilize a process in which a slurry that includes a stimulating fluid and proppant (e.g. sand) is created and then pumped into the well at high pressure. When water-based stimulating fluids are used (a process referred to as hydrofracturing), the proppant, water, and appropriate chemicals can be mixed and then pumped to a high pressure for injection into the well. Fluids other than water may be used in the stimulating fluid. For example, carbon dioxide ($CO_2$), nitrogen ($N_2$), and hydrocarbon-containing substances (e.g., from stranded gas) may offer one or more advantages over water. For instance, liquid $CO_2$ may replace a significant portion, if not all, of the water used in conventional hydrofracturing. Using $CO_2$ may improve hydrocarbon production by inducing less damage in the formation and proppant pack. Additionally, environmental challenges associated with hydrofracturing may be ameliorated.

Several factors, however, may render $CO_2$-fracturing impractical or inefficient. Such factors include the cost of $CO_2$, availability of $CO_2$, loss of hydrocarbon gases due to flaring, and cost of equipment and labor. $CO_2$, as a stimulating fluid, may be injected through a wellbore as a supercritical or "dense-phase" fluid. $CO_2$ liquid can be costly to make, store, and control at a well-pad. Recently, there has been an emphasis on injecting fluids, such as $CO_2$, nitrogen, and/or hydrocarbon fluids (e.g., methane and/or other hydrocarbon components) into wells that have been producing for one year or more. The purpose of injecting these fluids into older wells is to increase recovery. Such a process is often referred to as a Huff and Puff, which has the effect of Enhanced Oil Recovery (EOR) for unconventional formations.

The flowback period typically lasts a number of days, such as two days to two weeks. The flowback stream is characterized by highly variable flowrates, in the case of wells being stimulated with $CO_2$, a $CO_2$-rich composition that changes significantly over a period of days. Conventional techniques vent or flare the $CO_2$-rich flowback due to the challenges caused by the high variability in flowrates and gas compositions. For example, when $CO_2$-concentration is high (e.g. $CO_2$ greater than 70% of the flowback stream), the gas of the flowback stream is vented. This gas is a mixture that includes $CO_2$ and natural gas. When the $CO_2$-concentration is lower, but still greater than the $CO_2$-concentration found in a natural gas pipeline, the gas of the flowback stream is either flared or sent for cleanup. Accordingly, a substantial amount of $CO_2$ may be lost during the flowback period. If other fluids are used to stimulate a well, such as nitrogen or hydrocarbon-containing substances (e.g., from stranded gas). At least a portion of these fluids may also be lost.

BRIEF DESCRIPTION

In an embodiment, a method is provided that includes: (a) processing a flowback stream at an operating site to provide a working fluid that includes a stimulating fluid. The flowback stream is generated by a post-stimulated well injected with the stimulating fluid. The operating site is within a geographical region. The method also includes: (b) transferring the working fluid from the operating site to a current temporary processing facility (TPF) that is located remotely with respect to the operating site in the geographical region. The method also includes: (c) purifying the working fluid at the current TPF, thereby providing the stimulating fluid. The method also includes: (d) transferring the stimulating fluid from the current TPF to an injection site that is located remotely with respect to the current TPF and the operating site. The method also includes: (e) transporting fluid-handling equipment from the current TPF to a new TPF. The flowback stream continues to be received at the operating site. Operations (a)-(e) are repeated a plurality of times. The current and new TPFs are at different locations within the geographical region.

It is noted that operations or stages (a)-(e) may occur concurrently. For example, fluid may be processed (e.g., at (a)) as other fluid is transferred (e.g., (b)). Optionally, the operations (a), (b), (c), and (d) may be referred to collectively as recovering or recapturing the stimulating fluid.

In one or more aspects, transporting the fluid-handling equipment from the current TPF to the new TPF occurs after determining that a designated condition has been satisfied. Optionally, the designated condition is satisfied upon determining that a sufficient volume of the stimulating fluid has been directed to the injection site and/or that the operating site is capable of handling the flowback stream without directing the working fluid to the TPF. The volume of the stimulating fluid directed to the TPF may include the volume of the stimulating fluid received at the injection site and the volume of the stimulating fluid that is in transit to the injection site.

In one or more aspects, locations of the current and new TPFs are selected such that the fluid-handling equipment is used substantially continuously for at least one month of a sustained campaign. Operations (a)-(d) occur concurrently for at least a portion of the at least one month.

In one or more aspects, the fluid-handling equipment includes equipment for at least one of purifying or storing the stimulating fluid. For example, the fluid-handling equipment may include one or more of a compressor, a condenser, an enricher, or a storage vessel.

In one or more aspects, the operating site is a first operating site and operation (a) includes processing a flowback stream at a second operating site to provide a working fluid from the second operating site that includes the stimulating fluid. Operation (b) includes transferring the working fluid from the second operating site to the current TPF. The second operating site is remotely located with respect to the first operating site, the injection site, and the current TPF.

In one or more aspects, the stimulating fluid includes $CO_2$ and the flowback stream includes a mixture of two or more of the $CO_2$, sand, hydrocarbon-containing gas, oil, or water. The stimulating fluid is combined with additional material at the injection site prior to injecting into a well.

In one or more aspects, the method also includes disassembling a temporary pipeline that fluidly connects the current TPF and the injection site for the current TPF and assembling a temporary pipeline that fluidly connects the new TPF and at least one of an injection site for the new TPF or an operating site for the new TPF.

In one or more aspects, the method also includes recovering natural gas liquid from the working fluid at the current TPF or generating at least one of electrical power or the stimulating fluid by combusting hydrocarbon-containing gases at the current TPF.

In an embodiment, a system is provided that includes one or more processors and a storage medium that is configured to store programmed instructions accessible by the one or more processors. The one or more processors are configured to (e.g., execute the store programmed instructions in order to) determine an outgoing volume of a stimulating fluid for transfer from a current temporary processing facility (TPF) to at least one other location. The at least one other location includes an injection site having one or more wells configured to receive an injection of the stimulating fluid. The one or more processors are also configured to determine an incoming volume of a working fluid to the current TPF. The working fluid is transferred, at least in part, from an operating site having a post-stimulated well injected with the stimulating fluid. The working fluid is derived from a flowback stream from the post-stimulated well of the operating site. The one or more processors are also configured to generate operating instructions, based on the outgoing and incoming volumes. The operating instructions include at least one of (a) process instructions for controlling fluid-handling equipment at the current TPF to recover the stimulating fluid; (b) transfer instructions for transferring the stimulating fluid from the current TPF to the injection site; or (c) transport instructions for transporting storage equipment at the current TPF to a new TPF.

In one or more aspects, the operating instructions are also based on a composition of the working fluid from the operating site.

In one or more aspects, the operating instructions include instructions for combusting hydrocarbon-containing gases at the current TPF to generate at least one of electrical power or the stimulating fluid.

In one or more aspects, the operating instructions include instructions for disassembling a temporary pipeline that fluidly connects the current TPF and the operating site.

In one or more aspects, the operating instructions are based on the flowrate of the flowback stream at the operating site.

In one or more aspects, prior to determining the outgoing and incoming volumes, the one or more processors are configured to analyze locations of sites that include the operating and injection sites and determine the location of the current TPF. The location of the current TPF is determined, at least in part, based on an estimated outlay for transferring the working fluid from the operating site to the current TPF and/or an estimated outlay for transferring the stimulating fluid from the current TPF to the injection site. In particular embodiments, a location of the current TPF may be determined, at least in part, based on an estimated outlay for constructing a temporary pipeline for transferring the working fluid from the operating site to the current TPF.

In one or more aspects, prior to determining the outgoing and incoming volumes, the one or more processors are configured to analyze locations of sites that include the operating site and the injection site. The sites include at least three separate sites within the geographical region. The one or more processors are configured to determine, based on the locations of the sites within the geographical region, a campaign schedule that identifies an order in which the sites will be stimulated and at least one location for the current TPF.

In an embodiment, a system is provided. The system includes one or more processors and a storage medium that is configured to store programmed instructions accessible by the one or more processors. The one or more processors are configured to determine an outgoing volume of a stimulating fluid for transfer from a current temporary processing facility (TPF) to at least one other location. The at least one other location includes an injection site having one or more wells configured to receive an injection of the stimulating fluid. The one or more processors are also configured to determine an incoming volume of a working fluid to the current TPF. The working fluid is transferred, at least in part, from an operating site having a post-stimulated well injected with the stimulating fluid. The working fluid may be derived from a flowback stream from the post-stimulated well of the operating site. The one or more processors are also configured to generate operating instructions, based on the outgoing and incoming volumes, that specify parameters for at least one of controlling a flowrate of the flowback stream at the operating site, processing the flowback stream at the operating site to provide the working fluid, or transferring the working fluid to the current TPF.

In one or more aspects, the parameters identify when to cease processing the working fluid for recovering the stimulating fluid.

In one or more aspects, the parameters include parameters for processing the flowback stream to a lower-quality stimulating fluid and parameters for transferring the lower-quality stimulating fluid to the current TPF.

In one or more aspects, the parameters include parameters for compressing the working fluid to a designated pressure for storage. The designated pressure of the working fluid may be greater than a designated pressure of a higher-purity stimulating fluid in storage at the current TPF.

In an embodiment, a method is provided that includes recovering (or recapturing) a stimulating fluid. The recovering of the stimulating fluid includes processing a flowback stream at an operating site to provide a working fluid that includes a stimulating fluid. The flowback stream is generated by a post-stimulated well injected with the stimulating fluid. The operating site is within a geographical region. The recovering of the stimulating fluid also includes transferring the working fluid from the operating site to a current temporary processing facility (TPF) that is located remotely with respect to the operating site in the geographical region. The recovering of the stimulating fluid also includes purifying the working fluid at the current TPF, thereby providing the stimulating fluid. The method also includes transferring the stimulating fluid from the current TPF to an injection site that is located remotely with respect to the current TPF and the operating site. The method also includes transporting fluid-handling equipment after determining a designated condition has been satisfied. The fluid-handling equipment is transported from the current TPF to a new TPF. The flowback stream continues to be received at the operating site after the designated condition has been satisfied. The recovering of the stimulating fluid, the transferring of the stimulating fluid, and the transporting of the fluid-handling equipment is repeated a plurality of times. The current and new TPFs are at different locations within the geographical region.

In an embodiment, a method is provided that includes determining an outgoing volume of a stimulating fluid for transfer from a current temporary processing facility (TPF) to at least one other location. The at least one other location includes an injection site having one or more wells configured to receive an injection of the stimulating fluid. The method also includes determining an incoming volume of a working fluid to the current TPF. The working fluid is transferred, at least in part, from an operating site having a post-stimulated well injected with the stimulating fluid. The working fluid from the operating site is derived from a flowback stream of the post-stimulated well of the operating site. The method also includes generating operating instructions based on the outgoing and incoming volumes. The operating instructions include at least one of (a) process instructions for controlling fluid-handling equipment at the current TPF to recover the stimulating fluid; (b) transfer instructions for transferring the stimulating fluid from the current TPF to the injection site; or (c) transport instructions for transporting storage equipment at the current TPF to a new TPF.

In an embodiment, a method is provided that includes determining an outgoing volume of a stimulating fluid for transfer from a current temporary processing facility (TPF) to at least one other location. The at least one other location includes an injection site having one or more wells configured to receive an injection of the stimulating fluid. The method also includes determining an incoming volume of a working fluid to the current TPF. The working fluid is transferred, at least in part, from an operating site having a post-stimulated well injected with the stimulating fluid. The working fluid from the operating site may be derived from a flowback stream from the post-stimulated well of the operating site. The method also includes generating operating instructions, based on the outgoing and incoming volumes, that specify parameters for at least one of controlling a flowrate of the flowback stream at the operating site, processing the flowback stream at the operating site to provide the working fluid, or transferring the working fluid to the current TPF.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
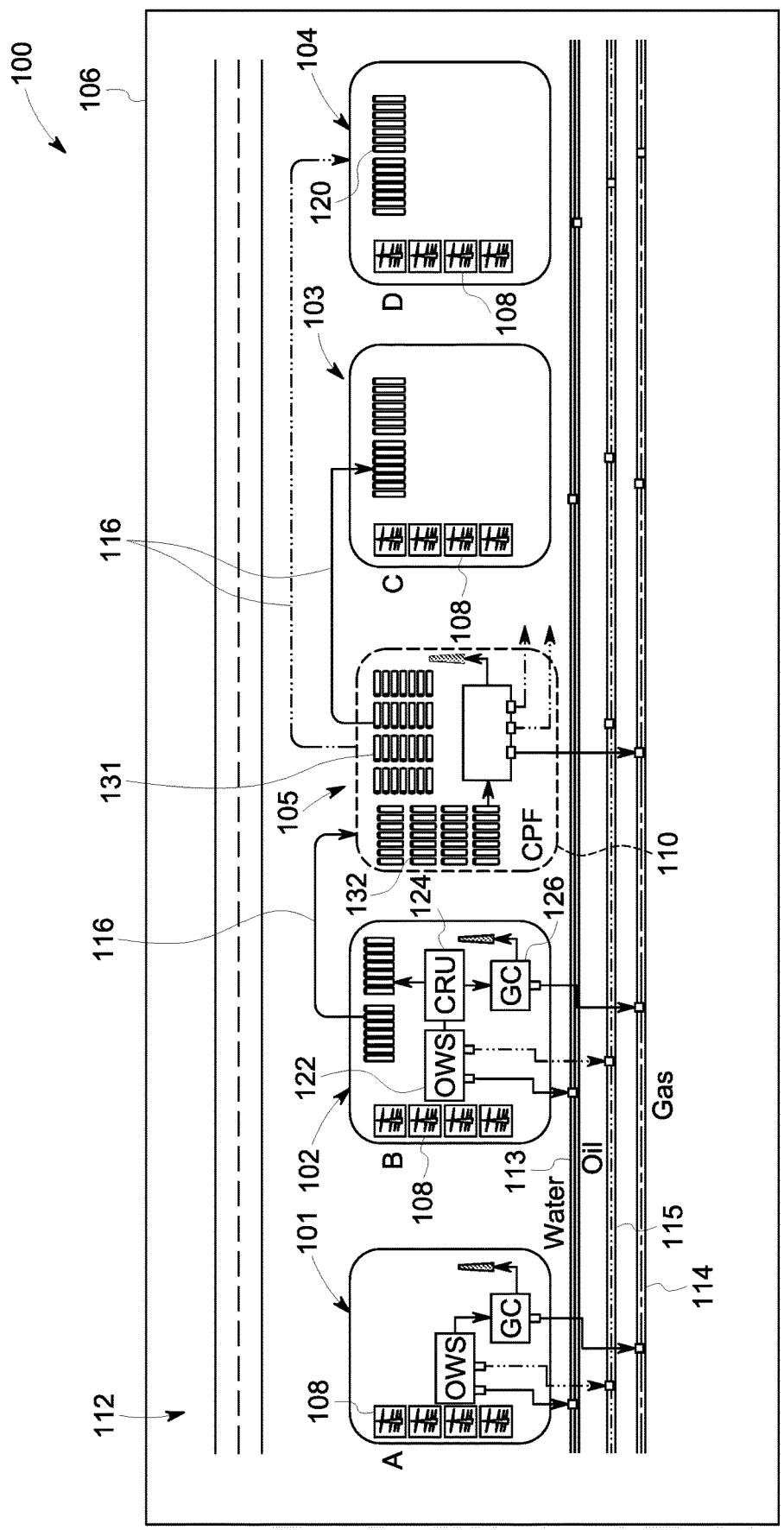
FIG. 1 is a schematic illustration of a system in accordance with one embodiment that spans multiple sites in a geographical region.

Embodiments described herein include methods or systems for managing recovery of a stimulating fluid from a flowback stream in order to re-use the stimulating fluid. Non-limiting examples of the stimulating fluid include $CO_2$, nitrogen, and hydrocarbons. The stimulating fluid may be injected with other material, such as a proppant. The flowback stream flows from a well of a subterranean reservoir that has been injected with the stimulating fluid. The purpose of the stimulating fluid is to change properties of matter in the reservoir and increase pressure in the reservoir so that a fluid flows from the reservoir more easily and that more of a desired fluid can be extracted. Wells that have been injected with the stimulating fluid such that the properties of the fluid are permitted to change (e.g., through fracturing or changing the viscosity and/or miscibility of the fluid) may be referred to as "post-stimulated wells." The post-stimulated well produces the flowback stream having a desired fluid, among other things. Post-stimulated wells may include those wells that have only been stimulated once, but also those wells that have been injected a second time (or more) in order to produce a fluid stream from which desired fluids may be obtained.

In particular embodiments, the stimulating fluid includes $CO_2$. As such, the following description frequently uses $CO_2$ as an example of a stimulating fluid. It should be understood, however, that a variety of stimulating fluids exist and/or fluids that are injected into a subterranean reservoir may be recovered and re-used. Accordingly, although the following description may refer to $CO_2$, it should be understood that the more generic term "stimulating fluid" may replace the term $CO_2$ in cases where other fluids are used. The other fluids may include, for example, hydrocarbon gases (e.g., such as those from stranded gas) nitrogen, or a combinations of such fluids. The stimulating fluid may be injected as part of an initial hydraulic fracturing process or as part of a re-stimulation process that is intended to increase recovery from wells that have been producing for some time.

The flowback stream (or fluid stream) is processed at multiple stages to recover the stimulating fluid. After the flowback stream exits the well and immediately prior to becoming the stimulating fluid, the fluid may be referred to as a "working fluid." After a number of stages, the working fluid may essentially be the stimulating fluid, but at an insufficient purity. For example, the working fluid after a number of stages may be a fluid of a lower quality ("Quality2"), while the stimulating fluid may be the fluid of a higher quality ("Quality1").

A challenge for stimulating wells is the logistics for sourcing and storing the fluid that will be used for stimulation, recovering the stimulating fluid from the flowback stream, re-using the stimulating fluid, and disposing unused or unwanted fluid. Using $CO_2$ as an example of a stimulating fluid, a particular challenge is providing sufficient flowrates of $CO_2$ during injection (e.g., about 2,000 to 10,000 tons of $CO_2$/well over a period of two to ten days). Another challenge is the handling of high rates of $CO_2$ during flowback (e.g., 500 to 5,000 tons over a period of two to four days (or more) per well). A well-pad may contain a single well or a plurality of wells (e.g., 2, 3, 4, 5, 6, 7, 8 wells or more). Over a few months, several well-pads in a geographical region (e.g., 5 $km^2$, 30 $km^2$, 50 $km^2$, 100 $km^2$ or more) may be slated for $CO_2$-injection. Thus, the $CO_2$ required for each well-pad may exceed 25,000 to 40,000 tons while the $CO_2$ required for the entire geographical region may exceed 50,000 to 200,000 tons over a span of a few months.

Various embodiments set forth herein utilize or control operation of a temporary processing facility (TPF) that is positioned between a well that is scheduled to be injected and another well that is producing a flowback stream. More specifically, the TPF is configured to receive a working fluid from one or more wells, process the working fluid to provide a stimulating fluid, and allow the stimulating fluid to be transported to one or more other wells and/or other destinations. In some embodiments, the TPF is located between separate sites. Each of these sites may have a plurality of wells. The TPF may be transportable such that the TPF can be moved to different areas between other sites.

Although the TPF may be transportable, it should be understood that the entire TPF is not necessarily movable as a single unit. In many cases, the TPF may include separate units that are moved at different times to a new location. The TPF may be assembled at the new location and then operated as a single system. For example, filters, condensers, enrichers, dehydration units, pressure regulators, and storage vessels may be moved to another site for assembling the TPF at the new location. In various embodiments, the units or a combination of units (e.g., a sub-system) may be supported on mobile transports, such as skids or trailers. The mobile transports may be loaded onto or connected to a vehicle (e.g., truck) and hauled to the new location. In this manner, large sections of the TPF may be transported and more quickly connected to other sections of the TPF at the new location.

In some embodiments, a TPF may include storage vessels or containers for storing a fluid (e.g., the working fluid or the stimulating fluid) at a designated specification or standard. The fluid may be or include $CO_2$ stored within vessels (e.g., liquid-$CO_2$ at about 350 pounds per square inch gage (psig)/$-10°$ F.) or high pressure tanks (e.g. greater than 1,200 psig/ambient T). Fluids may be stored at different specifications. For example, $CO_2$ recovered from a post-stimulated flowback stream may be stored at a first predetermined specification, and $CO_2$ that has been generated on-site or provided by another source may be stored at a different second predetermined specification. The specifications may differ by composition, purity, pressure, and/or temperature. The TPF may also include purification equipment to purify the fluid. For example, at the TPF, Quality2 $CO_2$ may be purified into Quality1 $CO_2$ either for reuse in stimulation or for a different end-use (e.g. enhanced oil recovery (EOR)). The TPF may also include fluid-generation equipment that generates the stimulating fluid. For example, hydrocarbon-containing fluids (e.g., natural gas liquids) may be combusted to power the generation of $CO_2$.

One or more embodiments may include methods or systems for managing an extraction campaign in which the stimulating fluid includes re-used stimulating fluid. For example, one source of the stimulating fluid may be a post-stimulated well, and another source may be a third party that generates the stimulating fluid. During the campaign, the volumes received from the different sources may change. Other factors, such as costs of the stimulating fluid, may also change throughout the campaign, which may be between several months or several years. Embodiments may be configured to manage recovery, production, delivery, and use of the stimulating fluid in a more cost-efficient manner compared to conventional methods.

Embodiments may include one or more processors and, optionally, a storage medium having stored programmed instructions that are accessible to the one or more processors. The one or more processors may be configured to execute methods set forth herein. For example, the one or more processors may be configured to determine an outgoing volume of a stimulating fluid from the TPF, determine an incoming volume of a working fluid to the TPF, and generate operating instructions, which are based on the outgoing and incoming volumes, that specify operation of one or more sites (e.g., operating site and/or a TPF).

As used herein, a "stream" is fluid flowing out of a well. The stream may be a "flowback stream" or a "production stream." A flowback stream is the initial fluid stream that flows back to the surface after the well has been stimulated. The flowback stream may be a slurry and often includes two or more of the stimulating fluid, sand (or other unwanted solid matter), hydrocarbon-containing substances, or water. Hydrocarbon-containing substances may include at least one of a liquid (e.g., oil), condensates (e.g., natural gas liquids, such as ethane, propane, and butane), and gases (e.g., gases rich with methane). While the flowback period may occur over a two-week period, the flowback stream of interest for a $CO_2$ stimulation application typically flows for two to five days and can have highly variable flowrates. After the flowback stream is permitted to flow for some time, the stream becomes the production stream. The production stream typically includes hydrocarbon-containing substances and water with small amounts of unwanted matter, if any. The production stream has relatively stable flowrates and lower pressure compared to the flowback stream.

As used herein, the term "fluid" includes one or more liquids, one or more gases, or a combination thereof. Different liquids or gases within a fluid may be miscible or immiscible. In some cases, the fluid will also include solid matter (e.g., sand or other unwanted solid matter). As used herein, the term "working fluid" refers to a fluid that has been produced by a well, but is not the desired stimulating fluid. In some embodiments, the working fluid may be an "intermediate fluid" because the working fluid represents the fluid that is neither the input fluid (e.g., flowback stream) nor the output fluid (e.g., stimulating fluid). The term "resource fluid" is not intended to be limiting and means any desired fluid that may be used by the enterprise.

The working fluid passes through different processing stages and, as such, the working fluid may have different compositions, such as different levels of purity (e.g., percent $CO_2$). Thus, although the working fluid may be referred to generally throughout, it should be understood that the working fluid may have a different composition based upon the processing stage that the working fluid last exited or is undergoing. Both the flowback stream and the working fluid include the stimulating fluid that is to be re-used. However, both the flowback stream and the working fluid are processed (e.g., purified) to recover the stimulating fluid. As such, the stimulating fluid may said to be derived from the flowback stream, the working fluid, or a combination of these streams and other components.

As used herein, the term "stimulating fluid" does not require that the fluid be the same fluid that will be injected into a well. For example, the stimulating fluid may be $CO_2$ in some embodiments. $CO_2$ is often combined with other material (e.g., proppant) at the injection site. As such, a stimulating fluid may be only a portion of the fluid that is injected into a well.

As used herein, the term "site" is an area that has been modified for a designated purpose, such as extracting a resource fluid (e.g., oil and/or gas) and/or processing a fluid. A site is typically configured to accommodate fluid-handling equipment. Fluid-handling equipment may include fluid-processing equipment (e.g., compressors, separators, dehydration units, pressure-regulators), storage vessels (e.g., pressure-controlled tanks, open-top tanks, and the like), or other equipment that is used to inject into one or more wells, receive the flowback stream from the subterranean reservoir, capture the desired resource fluid, and handle fluids. For example, the site may be leveled and cleared. A site may include only a single well or a plurality of wells.

Sites may be characterized as an injection site, an operating site, or a processing site. In some embodiments, a single site may be both the injection site and the operating site. In such instances, however, the injection site and the operating site would not be remote with respect to each other. The injection site is an area having one or more wells that are presently being injected and/or about to be injected. The operating site is an area having one or more post-stimulated wells that are presently producing a fluid stream. The processing site is the location of a TPF in which a working fluid may be processed (e.g., purified) to provide a re-usable stimulating fluid. Particular sites may also be referred to as well-pads. For example, the operating sites and the injection sites may be well-pads. Optionally, the processing site may be positioned adjacent to or at least partially overlap an operating site, an injection site, or a site that was producing a stream but is no longer producing a stream.

The terms "operating," "injection," and "processing," when used to label different sites, characterize a relationship among the different sites for a designated time period. After the designated time period, the sites may have different relationships with respect to one another and, as such, may be assigned different labels. For example, an injection site may become an operating site after the stimulating fluid has been permitted to change the properties of the fluid within the subterranean reservoir.

Although it is contemplated that wells may be stimulated concurrently, wells are typically stimulated one at a time or, in other words, separately. Fracturing (or fracing) is a type of stimulation. In some cases, the multiple wells may be fractured (or fraced) in accordance with a "zipper" fracturing technique. During a zipper fracturing protocol, multiple wells are fractured in sequence. One well may be fractured by injecting a stimulating fluid (e.g., $CO_2$) and then an adjacent well may be fractured. The multiple wells may be fractured in sequence with each well being injected with the stimulating fluid multiple times. For example, Well A is positioned adjacent to Well B, which is also adjacent to Well C. Well C is adjacent to Well D. Wells A-D may be separately injected with the stimulating fluid according to the following schedule: Well A, Well B, Well C, Well D, Well A, Well B, Well C, Well D, . . . . It should be understood that the above schedule is only one example of how the stimulating fluid may be injected into the different wells of a single site.

Yet in other embodiments, fluids may be injected into older wells that have been previously hydraulically-fractured. Such processes may be referred to as re-stimulation, huff and puff, and/or EOR for unconventional hydrocarbons. Accordingly, it should be understood that wells may be injected for different purposes and in accordance with different protocols or schedules.

As used herein, the phrases "flowback management" or "managing a flowback stream" or derivatives thereof refer to controlling a flowrate of the flowback stream and/or a pressure of the flowback stream. Because the flowrate and/or pressure may be dictated by a volume of the working fluid that is presently on-site, the phrases "flowback management" or "managing a flowback stream" and like terms may also refer to controlling one or more processes for treating the flowback stream and/or transferring the working fluid to a remote site. Accordingly, the phrases "flowback management" or "managing a flowback stream" and like terms may refer to at least one of: (a) controlling a flowrate of a flowback stream; (b) controlling a pressure of the flowback stream; (c) processing the flowback stream (e.g., separating different phases, capturing the working fluid, etc.); or (d) transferring the working fluid that is recovered from the flowback stream to a remote site in order to make space available for more working fluid.

As used herein, the term "processing," when used in relation to a fluid, includes changing at least one of a composition of the fluid or a property of the fluid. For example, processing may include removing unwanted solid matter, recovering a designated gas, changing a pressure of the fluid, or changing a temperature of the fluid. For example, the flowback stream is processed by separating oil, gas, sand, and water from one another. Purification is a type of processing. Purification includes removing unwanted matter to increase the purity of a designated fluid.

As used herein, the terms "transfer" or "transferring" or derivatives thereof includes moving a fluid (e.g., working fluid or stimulating fluid) from one location to another location. For example, the fluid may be transferred by at least one of: (1) flowing through a conduit (e.g., pipeline); (2) hauling in tanks by a vehicle (e.g., truck, train, or the like); or (3) shipping through a waterway. In some cases, temporary pipelines are assembled to transfer a working fluid (e.g., Quality2 $CO_2$) from a site currently receiving a flowback stream to a processing site. In some cases, temporary pipelines are assembled to transfer a working fluid (e.g., Quality1 $CO_2$) from the processing site to a site that will use the working fluid for stimulating one or more wells. In other cases, existing oil, water, or gas pipelines may be used instead of temporary pipelines, assuming that the existing pipelines meet the engineering requirements (e.g. pressure rating, material selection, etc.).

As used herein, the terms "transport" or "transporting" or derivatives thereof includes moving objects away from a site or bringing objects to a site. The objects may include equipment that is used to process a fluid, to transfer the fluid, or to otherwise handle the fluid. For example, equipment may include a condenser, an enricher, conduit (e.g., pipeline) through which the fluid flows, and the like.

In some embodiments, the TPF is located in close proximity to one or more injection sites that are scheduled for stimulation and/or in close proximity to one or more operating sites having a flowback stream. In particular embodiments, the TPF is a transportable system that could be located near sites for a designated time period (e.g., weeks or months, such as four to six months) and then moved to another location. The TPF may be in fluid communication with the sites through at least one of (a) a temporary pipeline; (b) roadways that allow trucks for hauling vessels; (c) rails that allows locomotives or other off-highway vehicles; or (d) waterways that permit shipping.

The TPF may have multiple functions. The TPF functions as a storage facility that receives a stimulating fluid from one or more operating sites that are currently receiving a flowback stream. The TPF may also receive the stimulating fluid from other sources, such as a commercial vendor. The TPF also functions as a distribution site in which the stimulating fluid is transferred from the TPF to one or more injection sites. As an example, the TPF may accumulate the stimulating fluid over a period of time from the one or more operating sites so that the stimulating fluid may be available for transfer to the one or more injection sites. An operating site may receive a large amount of fluid from the flowback stream, and an injection site may require a large amount of fluid for stimulation. In either case, the site may not be able to accommodate the large amount of fluid. As such, the TPF may function as a buffer zone. The TPF may also function as a purifier of the stimulating fluid from the operating site(s) or from other sources. The TPF may purify the stimulating fluid to different standards. The TPF may also function as a stimulating fluid generator that generates the stimulating fluid using resources available to the TPF.

FIG. 1 is a schematic illustration of a system 100 in accordance with one embodiment. The system 100 includes a plurality of separate sites 101-105 located within a geographical region 106. The system 100 is configured extract a resource fluid (e.g., hydrocarbon-containing fluid) from a subterranean reservoir by stimulating (e.g., fracturing) formations within the reservoir. The sites 101-105 have been prepared for at least one of injecting fluid into a well 108, receiving fluid from the well 108, or processing fluid on-site. The geographical region 106 includes a large area that can accommodate multiple separate sites. For example, the geographical region 106 may be less than less than 10,000 $km^2$, or less than 5,000 $km^2$, or less than 2,000 $km^2$, or less than 1,000 $km^2$, or less than 500 $km^2$.

The sites 101-105 include permanent sites 101-104 and a temporary processing site 105. The processing site 105 is the location of a TPF 110. As described herein, the TPF 110 is configured to process working fluid received from a site, thereby generating a stimulating fluid that may be used elsewhere. The TPF 110 is configured to store the working fluid and/or the stimulating fluid. The TPF 110 may be assembled, disassembled, and re-assembled at different sites within the geographical region 106.

The permanent sites 101-104 may be operating sites that are presently receiving a fluid stream from the reservoir and/or injection sites that are presently injecting a stimulating fluid or are scheduled to inject a stimulating fluid in the near future (e.g., less than a month). One or more of the permanent sites 101-104 may also be inactive.

As shown, the sites 101-105 may be interconnected through a combination of pathways 112 (e.g., roadways, waterways, tracks) such that a vehicle may move along the pathway to transfer fluid and/or transport equipment, among other things, between different sites. The pathway 112 shown in FIG. 1 is a roadway configured to support trucks, but other pathways or a combination of pathways may exist in other embodiments. The sites 101-105 are also interconnected through pipelines 113-116. The pipelines 113-115 include a water pipeline 113, a gas pipeline 114, and an oil pipeline 115. The pipelines 116 are temporary pipelines that extend between the TPF 110 and at least one permanent site. The pipelines 116 may be disassembled and transported before, during, or after the TPF 110 is transported. The pipelines 113-115 are permanent pipelines that extend between permanent sites. The pipelines 113-115 will remain in the same position for a longer period of time compared to the temporary pipelines 116. The pipelines 113-116 may be buried under ground or positioned above ground with adequate protection from being disturbed. In some cases pipelines 113-115 may serve as a temporary pipeline 116.

In the following description of FIG. 1, the stimulating fluid includes $CO_2$-fluid. It should be understood, however, that the stimulating fluid may have other components, which make up 100% or less of the stimulating fluid. Such components include hydrocarbon gases and/or fluids (e.g., such as hydrocarbon gases from stranded gas), nitrogen, or a combination of these. As shown, the permanent sites 101-104 are well-pads in which each well-pad depicts operations at different periods for the well-pad. More specifically, the permanent site 104 is an injection site that is scheduled to be stimulated with a $CO_2$-fluid. The injection site 104 illustrates a buildup period in which the $CO_2$-fluid is received from the TPF 110 through a temporary pipeline 116 and stored at a designated specification within storage vessels 120. At least some of the $CO_2$-fluid includes $CO_2$-fluid captured from a flowback stream. The injection site 104 is acquiring a designated volume of the $CO_2$-fluid prior to beginning the injection process. For example, about 5,000 tons of $CO_2$ within a period of two to four days for each well may be required for stimulating the well. The storage vessels 120 may be large tanks with capacities of 50 to 80 tons of $CO_2$. The permanent site 103 is an injection site that is presently injecting $CO_2$-fluid into one or more wells 108. The injection site 103 also includes storage vessels at a designated specification.

The permanent site 102 is an operating site that is presently producing a flowback stream during a flowback period. The operating site 102 includes an oil/water/sand (OWS) separation unit 122, a fluid-recovery (FR) unit 124, and a gas-cleanup (GC) unit 126. At the OWS separation unit 122, gas in the flowback stream is being separated from oil and water. The working fluid from the OWS separation unit 122 is transferred to the FR unit 124 to produce a $CO_2$-rich fluid. Residual $CO_2$-lean gas is further treated at the GC unit 126. The $CO_2$-lean gas may be processed to generate a gas that has a designated quality. For example, the $CO_2$-lean gas may be pipeline-quality gas having less than 2% $CO_2$.

The permanent site 101 is an operating site that is either presently receiving a fluid stream, which may be a flowback stream or a production stream. At the operating site 101, the fluid stream may include at least some $CO_2$, but it may not be economical to recover the $CO_2$. Nonetheless, the $CO_2$ of the fluid stream may be above pipeline-quality. As such, the operating site 101 does not include an FR unit, but does include a GC unit 126 for making the gas pipeline-quality. The GC unit 126 is in flow communication with the pipeline 115.

The TPF 110 is located at the processing site 105, which is separate from the other sites 101-104. The TPF 110 is in fluid communication with the operating site 102 and the injection site 103 such that fluid may be transferred therebetween by at least one of pipeline or vehicle transportation. The TPF includes two kinds of storage vessels 131 and 132. The storage vessels 131 are configured to store $CO_2$ (Quality1), which meets the requirements for stimulation. The storage vessels 132 are configured to store $CO_2$ (Quality2), which may be purified to meet Quality1 specifications.

The TPF 110 is in communication with the sites 102, 103 so that the TPF 110 may provide $CO_2$ to the injection site 103 for stimulation and receive a fluid from the operating site 102. The TPF 110 may operate as a distribution center that receives $CO_2$ from one or more sites and permits the $CO_2$ to be transferred to one or more sites. The $CO_2$ may be transferred as a gas or as a liquid and may be transferred through a pipeline or one or more vehicles (e.g., trucks, trains, and the like). As one example, a pressure within the pipelines may be at least 1200 psig and 70° F. As another example, a pressure within the pipelines may be at least 500 psig and 0° F.

In various embodiments, a flowback stream is produced at the operating site 102. The flowback stream may be processed (e.g., treated, separated, etc.) to provide a working fluid. The working fluid includes the stimulating fluid such that the working fluid may be further processed to produce the stimulating fluid. For example, at the operating site 102, different components of the flowback stream may be separated from one another (e.g., different gases may be separated, different liquids may be separated, and solid matter may be removed). In some embodiments, the operating site 102 may also process the working fluid to increase the purity with respect to the stimulating fluid.

The working fluid is transferred from the operating site 102 to a current TPF 110, which is located remotely with respect to the operating site 102 and the injection site 103. The working fluid at the current TPF 110 is further purified to recover the stimulating fluid (e.g., Quality1 $CO_2$). The stimulating fluid is transferred from the current TPF 110 to the injection site 103, which is located remotely with respect to the operating site 102. As such, a partially processed working fluid is transferred from the operating site 102 to the current TPF 110 where the working fluid is further processed to generate the stimulating fluid. The stimulating fluid is then transferred to the injection site 103.

For clarity, the TPF 110 may be referred to as the "current" TPF 110, because some embodiments may include multiple TPFs at different times. For example, a current TPF 110 at one location may be dis-assembled and the equipment from the current TPF 110 may be transported and assembled at another location to provide a new TPF 110.

Embodiments may determine when to transport equipment from the current TPF 110 and/or from the operating site 102. With respect to the current TPF 110, equipment from the current TPF 110 may be transported to the new TPF 110 after a designated condition has been satisfied. The designated condition for transporting equipment at the TPF may be, for example, a function of how much stimulating fluid is required by the injection site (or injection sites) in order to stimulate the well(s). As such, the designated condition may be satisfied when it is determined that the injection site has a sufficient volume of the stimulating fluid or will have a sufficient volume of the stimulating fluid after receiving the stimulating fluid that is in transit to injection site. The designated condition may also be a function of how much flowback is currently being produced at the operating site (or operating sites). Although the injection sites may no longer require the stimulating fluid, the TPF may keep the fluid-handling equipment at the TPF so that the operating sites may transfer the excess working fluid to the TPF. As one example, the designated condition may be satisfied in response to determining that (a) the injection site has a sufficient volume of the stimulating fluid or will have a sufficient volume of the stimulating fluid after receiving the stimulating fluid that is in transit to injection site and (b) the operating site is no longer receiving a flowback stream (e.g., it is operating in the production period) or that the operating site is capable of handling the present flowback stream (e.g., has enough of storage for the next few days).

Satisfaction of the designated condition may be determined using data relating to the above parameters. For example, the data may relate to (1) a total volume scheduled for the injection site for injection; (2) a volume of the stimulating fluid that has been delivered to the injection site; (3) a volume of the stimulating fluid that is currently in transit; or (4) a flow rate of the flowback stream. Data may "relate to" a parameter if it may be used to calculate or estimate the parameter.

Although the above example refers to one operating site and one injection site, it should be understood that a TPF may receive working fluid from more than one operating site and/or transfer the stimulating fluid to more than one injection site. To provide an example with multiple operating sites and multiple injection sites, the designated condition may be satisfied after determining that (a) the injection sites have a sufficient volume of the stimulating fluid or will have a sufficient volume of the stimulating fluid after receiving the stimulating fluid that is in transit to injection sites and (b) the operating sites are no longer receiving flowback streams (e.g., they are operating in the production periods) or that the operating sites are capable of handling the flowback streams.

With respect to the operating site 102, equipment from the operating site 102 may be transported to a new operating site after a designated condition has been satisfied. For example, the designated condition for transporting equipment from the operating site 102 may be a function of at least one of a flowrate of the flowback stream; a concentration of the stimulating fluid within the flowback stream; or an elapsed time period after when the flowback stream began flowing at the operating site. Although the equipment has been transported from the operating site 102, the fluid stream (e.g., production stream) may continue to be received in order to extract a resource fluid.

The above operations may be repeated a plurality of times (e.g., a plurality of iterations) using TPFs at different locations within a geographical region and using different operating sites and/or injection sites. The TPFs may use at least some of the same equipment. In some embodiments, the new TPFs are located to reduce a cost of transferring the liquid between the different sites. In particular embodiments, essentially all of the fluid-handling equipment and storage vessels are transported to a new TPF.

Satisfaction of the designated condition may be determined by an individual and/or by one or more processors. For example, an individual may enter user inputs into a computing system that confirm a designated condition has been satisfied. In response to this input, instructions for changing operation at the TPF and/or one or more operating sites may be issued. As another example, an individual may enter data that may be used to determine whether the designated condition has been satisfied. For instance, an individual may enter user inputs relating to a flowrate at the operating site; user inputs that request a volume of stimulating fluid for an injection site; user inputs that confirm a sufficient volume of the stimulating fluid has been injected; or user inputs that change a cost of the stimulating fluid. Using the data, one or more processors may determine that a designated condition has been satisfied. In response to this determination, instructions for changing operation at the TPF and/or one or more operating sites may be issued.

It should be understood that the data upon which a decision has been based is not required to be entered by an individual. For example, flowrate data may be communicated to a computing system by a flowrate sensor. Storage data may be communicated to a computing system by computing devices or sensors attached to storage vessels.

Figure 2:
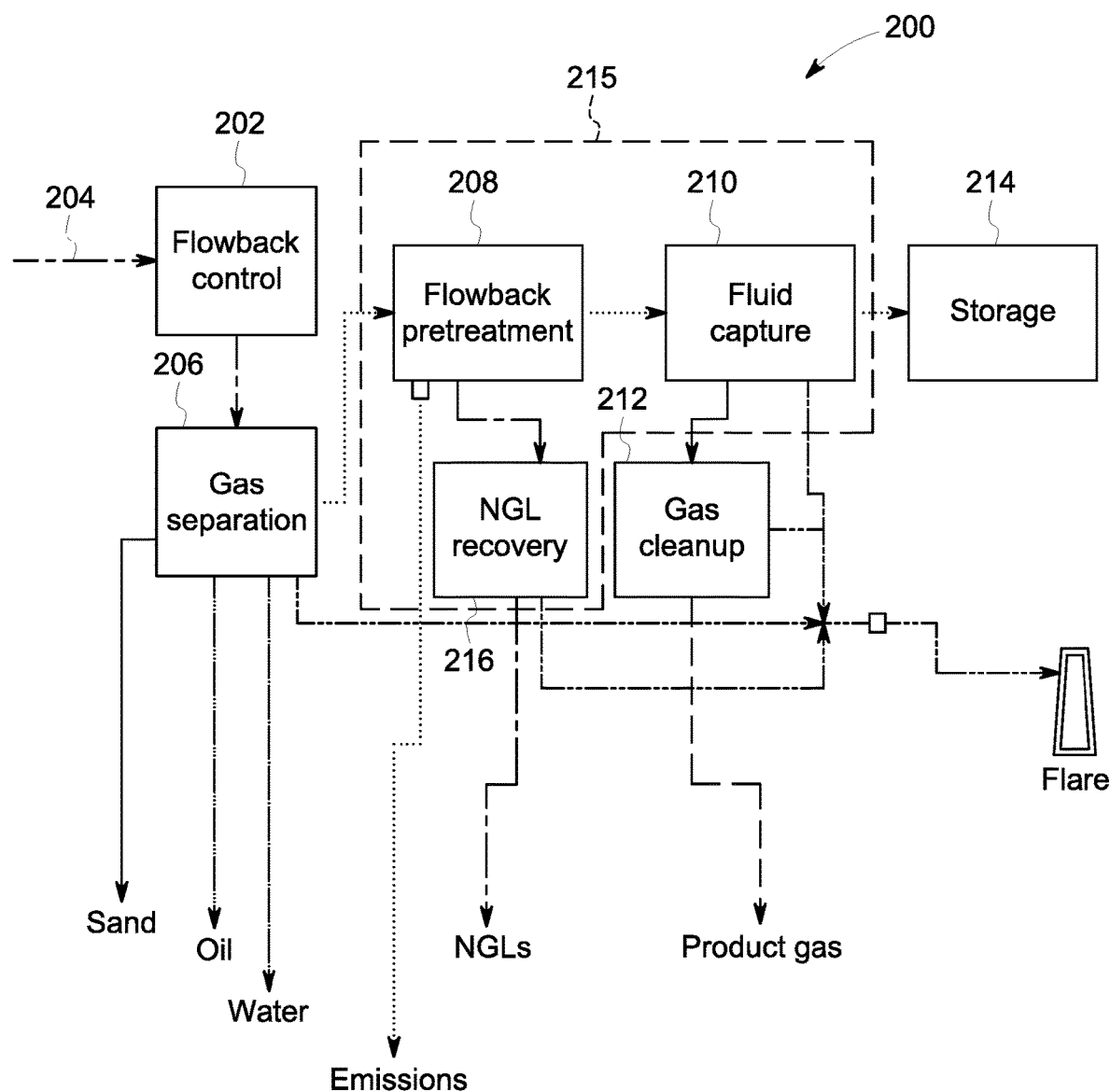
FIG. 2 is a schematic diagram of a system for management and recovery of a working fluid from a flowback stream of a post-stimulated well.

FIG. 2 is a schematic diagram of a system 200 that is configured to provide flowback management and one or more treatment or processing steps to recover a working fluid from a flowback stream. The system 200 may be located, for example, on an operating site that is presently receiving a flowback stream, such as the operating site 102 (FIG. 1).

As described above, the stimulating fluid in the following description includes $CO_2$. The system 200 may be configured to obtain a target $CO_2$-fluid composition (or specification). Target $CO_2$-fluid compositions (or specifications) may be in terms of % $CO_2$ or in terms of undesired components in the $CO_2$-fluid, for example, volatiles (Cl, $N_2$), or benzene, toluene, ethylbenzene and xylenes (BTEX) or $H_2S$. Although the system 200 will be described as managing $CO_2$-recovery and $CO_2$-recapture, it should be understood that the stimulating fluid may include another fluid or a combination of fluids and that embodiments may be designed to recover and recapture other stimulating fluids.

The system 200 includes a number of sub-systems that are operationally connected to one another. For simplicity, the sub-systems will be referred to as systems. In the illustrated embodiment, the system 200 includes a flowback-control system 202 that is configured to receive a fluid stream 204. As described above, the fluid stream may be a flowback stream or a production stream. In particular embodiments, the system 200 is designed to receive and process a flowback stream, although it is contemplated that the system 200 may also receive and process the production stream. A gas-separation system 206 of the system 200 is configured to receive fluid from the flowback-control system 202. The system 200 also includes a pretreatment system 208 that is configured to receive fluid from the gas-separation system 206, a fluid-capture system 210 that is configured to receive fluid from the pretreatment system 208, a gas cleanup system 212 that is configured to receive fluid from the fluid-capture system 210, and an optional storage system 214 that is configured to receive fluid from the fluid-capture system 210. A natural gas liquid (NGL) recovery system 216 may also be included in fluid communication with the pretreatment system 208.

Parameters of the flowback stream 204 are a function of the reservoir, the amount of $CO_2$ used for stimulation, the operating conditions during the $CO_2$-stimulation, and the operating conditions during the flowback period. A flowrate and composition of the flowback stream 204 may differ among wells over time.

In some embodiments, the fluid-capture system 210 and, optionally, the NGL recovery system 216 and/or the pretreatment system 208 form a transportable recovery unit (TRU) 215. More specifically, the TRU 215 may include each of the fluid-capture system 210, the pretreatment system 208, and the NGL recovery system 210. Alternatively, the TRU 215 may include each of the fluid-capture system 210 and the pretreatment system 208. Alternatively, the TRU 215 may include each of the fluid-capture system 210 and the NGL recovery system 210. In some embodiments, the pretreatment system 208 alone constitutes the TRU 215.

The TRU 215 may include a mobile transport (e.g., trailer or a skid (not shown)) that supports one or more of the systems (e.g., the pretreatment system 208, the fluid-capture system 210, and/or the NGL recovery system 216). For example, the TRU 215 may support the fluid-capture system 210 and one or both of the pretreatment system 208 and the NGL recovery system 216. In such embodiments, the TRU 215 may be disconnected from the system 200 and transported away from a site. In other embodiments, the fluid-capture system 210 may be supported by one or more transports, the optional pretreatment system 208 may be supported by one or more transports, and the optional NGL recovery system 216 may be supported by one or more transports. Optionally, the storage system 214 may be part of the TRU 215 and/or be supported by a transport.

Figure 3:
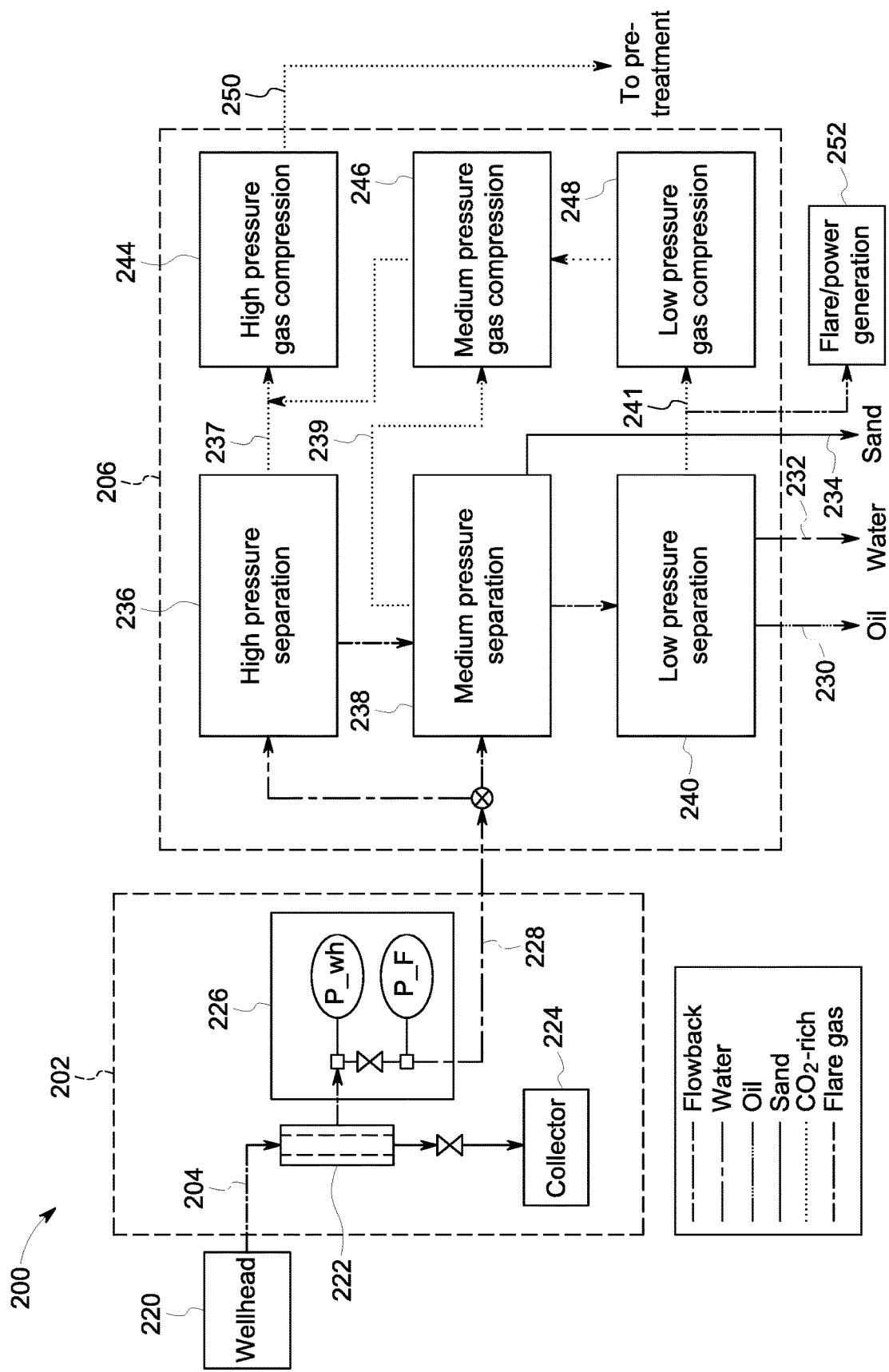
FIG. 3 is a detailed schematic diagram of a portion of the system of FIG. 2.
Figure 4:
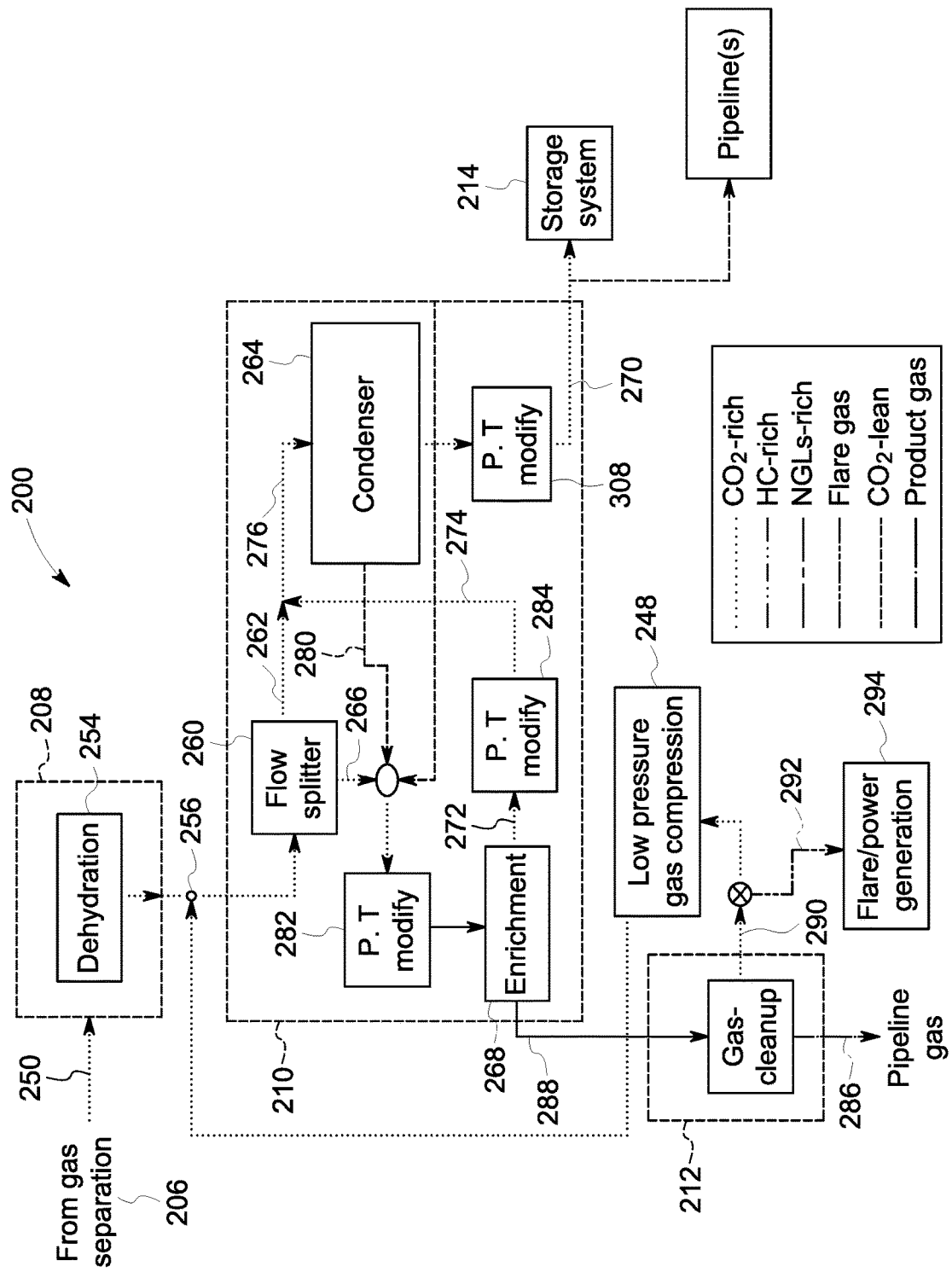
FIG. 4 is a detailed schematic diagram of a portion of the system of FIG. 2.

FIGS. 3 and 4 illustrate the system 200 in greater detail. The flowback stream 204 from a wellhead 220 is initially received by the flowback-control system 202. The flowrate of the flowback stream 204 is controlled as the flowback stream 204 flows through the flowback-control system 202. In some embodiments, unwanted solid matter, such as plug debris and/or sand (e.g., often referred to as "trash"), may be removed by a separator 222 and collected by a collector 224. The separator 222 may be referred to as a strainer, sand separator, or sand "knock-out." The unwanted solid matter may include large particles obtained during millout of plugs isolating the fracturing stages. A choke valve 226 provides for control of the flowback stream 204. For example, the choke valve 226 may change (e.g., decrease) the wellhead pressure (P_wh) to a desired flowback pressure (P_F). The flowback stream 204 is output from the flowback-control system 202 as a modified flowback stream 228 and enters the gas-separation system 206. The modified flowback stream 228 may also be referred to as a working fluid. The modified flowback stream 228 is the flowback stream 204 at a different pressure and with unwanted solid matter removed.

The gas-separation system 206 further processes the modified flowback stream 228 by separating different components of the stream. For example, a gas portion of the modified flowback stream 228 may be separated from oil 230 and water 232 that is contained in the modified flowback stream 228 and, if present, sand 234. Depending on one or more parameters (e.g., wellhead pressure, choking constraints), the components may be separated at a maximum possible pressure (P_H) (e.g. between 700 and 1050 pounds per square inch (psi)) in a high pressure gas separator 236. Additional separation of the components of the modified flowback stream 228 may occur in a medium pressure (P_M) gas separator 238 and in a low pressure (P_L) gas separator 240. For embodiments directed to $CO_2$, it is noted that the pressure (P) of the modified flowback stream 228 is less than the critical pressure (Pc) of $CO_2$ (P less than Pc of $CO_2$ (1050 psi)).

The gas separators 236, 238, and 240 may be configured to operate within a designated pressure range. For example, the medium pressure gas separator 238 may operate within 300 to 700 psi. The low pressure gas separator 240 may operate at less than 300 psi or, more particularly, less than 100 psi. The low pressure gas separator 240 may further degas the oil 230 and water 232 to recover residual gases. Optionally, a single piece of equipment (e.g., a single gas separator) may be configured to handle each of the pressure ranges. Optionally, only a single gas separator may be used.

The gas separators 236, 238, and 240 have output gas streams 237, 239, and 241, respectively. The output gas streams 237, 239, 241 are directed to a high pressure gas compressor 244, a medium pressure gas compressor 246, and a low pressure gas compressor 248, respectively. As shown in FIG. 3, gas having an insufficient pressure may be compressed repeatedly (e.g., outputted from the low pressure gas separator to the medium gas separator, and outputted from the medium pressure gas separator to the high gas separator). One or more of the compressors 244, 246, or 248 may be unused if the corresponding output gas has an excessive or otherwise improper pressure. Accordingly, the compressors 244, 246, 248 coordinate to provide an output fluid stream 250 at a designated pressure that is directed to the pretreatment system 208. The designate pressure may range between, for example, 300 to 900 psi.

Multiple gas streams and/or multiple possible pressures for the gas streams may be used to reduce the cost of downstream operations. For example, the gas compressors 244, 246, and 248 may enable separating the gas at a high pressure, thereby reducing a need for compression steps downstream. The gas compressors 244, 246, and 248 may also enable depressurizing the gas, thereby reducing a need for decompression steps downstream.

The designated pressure of the output fluid stream 250 may be a function of one or more parameters of the downstream fluid-capture system 210. As an example, the output gas stream 237 from the high pressure gas separator 236 is compressed in the high pressure gas compressor 244. An output gas stream 239 from the medium pressure gas separator 238 is compressed in the medium pressure gas compressor 246 and subsequently in the high pressure compressor 244. An output gas stream 241 from the low pressure gas separator 238 is compressed in the low pressure gas compressor 248 and subsequently in the medium pressure gas compressor 246 and the high pressure compressor 244.

Optionally, the output gas stream 241 from the low pressure gas separator 240, or a portion thereof, may not be compressed in the low pressure compressor 248. Instead, the output gas stream 241 may be directed to flare or for power generation, generally referenced as 252.

In some embodiments, the oil 230 and water 232 may be isolated in the medium pressure gas separator 238 and a final degassing of the oil 230 and water 232 may occur in separate vessels or the same vessel in the low pressure gas separator 240. In some embodiments, the output gas streams 237, 239, 241 that are fed to the compressors 244, 246, and 248, respectively, are filtered for trace solids and aerogels and coalescers to avoid carryover of water 232 and oil 230 into the compressors 244, 246, and 248.

To accommodate for the varying flowback rates, the different systems of the system 200, such as the gas separation system 206, and more particularly the process equipment, such as compressors, heat-exchangers, separation vessels, membrane modules, liquid pumps may each be chosen as a system of parallel units that are appropriately sized so that the entire flowrate regime can be handled without incurring over-design or under-design issues for desired separation or heat-transfer performance. For example, the flowrate of the flowback stream 204 from the wellhead 220 may range from 2 million standard cubic feet per day (MMSCFD) to 15 MMSCFD over a flowback period. Hence, the gas compressors in the gas separation system 206 may be organized as three individual compressors configured in a parallel arrangement, with each compressor having a capacity range of 2 to 5 MMSCFD, allowing the capability to handle flows from 2 to 15 MMSCFD by employing only one or all three of the compressors. Moreover, the lower range of the capacity may be further reduced to less than 1 MMSCFD by recirculating some of the fluid streams exiting each of the compressors at an outlet of each, back to a respective compressor-inlet after cooling. Similarly, the membrane modules utilized in the gas separation system 206 may be appropriately chosen to be a system of parallel modules (described presently) that may be switched on as needed depending on a flowrate of an input feed to a respective membrane section.

Referring now to FIG. 4, the pretreatment system 208 is configured to remove unwanted components from the output fluid stream 250. For example, the pretreatment system 208 may be configured to remove at least one of trace solids, aerogels, oil, hydrogen sulfide ($H_2S$), or water from the output fluid stream 250 to obtain a designated composition. To this end, the pretreatment system 208 may include a dehydrator 254 that is configured to remove water from the output fluid stream 250. The dehydrator 254 may be responsive to the composition of the output fluid stream 250. For example, liquid $CO_2$ at 350 psi and $-10°$ F. may require dehydration to less than 2 parts per million by volume (ppmv) water. However, dense $CO_2$ at 2,000 psi and $70°$ F. may require less dehydration to 100 ppmv water. The pretreatment system 208 outputs a pretreated fluid stream 256.

The dehydrator 254 may include one or more elements for dehydrating the output fluid stream 250. For example, the dehydrator 254 may include at least one of (a) a molecular sieve bed or beds; (b) $H_2O$-selective gas permeation membrane or membranes; or (c) desiccant bed or beds, such as calcium chloride ($CaCl_2$) or lithium chloride (LiCl). Schemes (b) and (c) may use a molecular sieve bed or beds. In addition to the above, scavengers, such as triazine or solid sorbents or $H_2S$-selective membranes, may also be used to remove hydrogen sulfide ($H_2S$).

A pretreated fluid stream 256 exits the pretreatment system 208 and is transferred to the fluid-capture system 210 of system 200. In some embodiments, the pretreatment system 208 may also be configured to remove NGLs. Optionally, the NGL recovery system 216 may receive the output fluid stream 250 before the output fluid stream 250 is transferred to the pretreatment system 250. The NGL recovery system 216 may remove NGLs.

The fluid-capture system 210 is configured to capture a designated fluid from the pretreated fluid stream 256. The designated fluid may be a lower quality stimulating fluid (or working fluid). For example, the fluid-capture system 210 may be configured to capture $CO_2$-fluid from the pretreated fluid stream 256 by condensing the pretreated fluid stream 256, controlling a temperature of the pretreated fluid stream 256, and enriching the pretreated fluid stream 256 with $CO_2$.

As shown in FIG. 4, the fluid-capture system 210 includes a flow splitter 260 that receives the pretreated fluid stream 256 from the pretreatment system 208. The flow splitter 260 may direct a portion 262 of the pretreated fluid stream 256 to flow into a condenser 264 and may direct a portion 266 to flow into an enricher 268. The condenser 264 may operate within a range of medium-to-high pressure. The flow splitter 260 is configured to control the portions 262, 266 of the pretreated fluid stream 256 to meet a target composition or specification. For example, the flow splitter 260 is configured to vary a percentage (e.g., between 0-100%) of the pretreated fluid stream 256 that is directed to the condenser 264 and vary a percentage of the pretreated fluid stream that is directed to the enricher 268. Optionally, the flow splitter 260 may direct a portion of the pretreated fluid stream 256 to other treatment processes.

The flow splitter 260, the enricher 268, and the condenser 264 interact or coordinate with one another to generate a captured fluid stream 270, which may also be referred to as a working fluid. The captured fluid stream 270 may be an intermediate quality of the desired stimulating fluid. For example, the captured fluid stream 270 may be a Quality2 $CO_2$-output stream (x_Q2). Because of the adaptable features of the gas separation system 206, the pretreatment system 208, and the fluid-capture system 210, the captured fluid stream 270 may have a desired concentration of the stimulating fluid, even though the flowback stream 204 changes over time. More specifically, despite the varying flow rates, pressures, and compositions of the flowback stream 204, the system 200 is configured to provide a captured fluid stream 270 having a desired concentration of the stimulating fluid.

The captured fluid stream 270 may be a function of a concentration of the stimulating fluid and/or another component. By way of example, a Quality2 $CO_2$-output stream may be a function of $CO_2$-concentration and a volatile component. The $CO_2$-concentration in the Quality2 $CO_2$-output stream may be, for example, between 85% to 99% $CO_2$. A methane concentration in the Quality2 $CO_2$-output stream may be, for example, between 1% to 10% methane. Depending upon the intended re-use of the captured fluid stream 270, the captured fluid stream 270 may have a composition that is sufficient for one or more purposes and require no additional purification. As shown in FIG. 4, the captured fluid stream 270 may be transferred to the storage system 214 and/or a TPF. The captured fluid stream 270 may be transferred directly through a pipeline or one or more vehicles (e.g., trucks, trains). The captured fluid stream 270 may also be stored within one or more vessels of the storage system 214 for subsequent transfer.

In some embodiments, the flow splitter 260 directs the portion 266 of the pretreated fluid stream 256 to the $CO_2$-enricher 268 and yields, via a $CO_2$-rich permeate stream 272, an enriched $CO_2$-stream 274 that mixes with the portion 262 of the pretreated fluid stream 256 from the flow splitter 260. The enriched $CO_2$-stream 274 and the portion 262 may form a combined fluid stream 276. The combined fluid stream 276 is sent to the condenser 264 where the bulk of the stimulating fluid (e.g., $CO_2$) is condensed as a liquid. Optionally, a residual gas stream 280 from the condenser 264 is returned to the enricher 268. The residual gas stream 280 may be, for example, the Quality2 $CO_2$-output stream 270.

The operating conditions in the condenser 264, and more specifically the temperature and pressure in the condenser 264, may be selected to reduce energy consumption, footprint, and performance. As a first example, the pressure within the condenser 264 may be about 900 psi, and the temperature within the condenser 264 may be between 55° F. and 60° F. As a second example, the pressure within the condenser 264 may be about 350 psi, and the temperature within the condenser 264 may be about 0° F. Either examples may yield a similar Quality2 $CO_2$-concentration. While the process of the first example requires more gas compression compared to the second example, it requires less refrigeration costs. Optionally, the condenser 264 may include or be in flow communication with a vapor-liquid separator (not shown) to provide the Quality2 $CO_2$-fluid.

The enricher 268 may be designed to enrich the working fluid using or more techniques. For example, the enricher 268 may execute a selective membrane process. The enricher 268 may be stable to hydrocarbon condensates. The enricher 268 may include one or more membranes formed of films or hollow fibers, comprised of selective materials, such as polyetheretherketone (PEEK), cellulose acetate, polyimides, or the like. For embodiments in which the stimulating fluid includes $CO_2$, the membrane material and operating conditions may be selected such that the $CO_2$-concentration of the permeate stream 272 is greater than the $CO_2$-concentration in the flowback stream 204. For example, the $CO_2$-concentration in the permeate stream 272 may be between 85% and 99%.

The temperature and pressure of the portion 266 of the pretreated fluid stream 256 entering the enricher 268 may be controlled by a compressor 282 having an aftercooler or a heat-exchanger. Similarly, pressure on a permeate-side of the enricher 268 may be selected so that a desired enrichment of the permeate stream 272, and more specifically the enriched stream 274, may be achieved based on the concentrations and membrane modular sizes employed. A compressor 284 disposed downstream of the enricher 268 may compress the permeate stream 272 exiting the enricher 268 to a designated pressure.

$CO_2$-concentration in a $CO_2$-lean gas retentate (non-permeate) stream 288 of the enricher 268 may be selected to achieve a designated performance. For example, $CO_2$-recovery in the permeate stream 272 may be improved based upon a selected value of the $CO_2$-concentration for $CO_2$-lean gas retentate stream 288. However, other selected values of $CO_2$ in the $CO_2$-lean gas retentate stream 288 may cause a lower $CO_2$-concentration in the permeate stream 272 and thus the combined, or mixed, gas stream 276 entering the condenser 264.

Accordingly, in order to achieve a desired concentration (y_Cond) of $CO_2$ entering the condenser 264, separation in the membrane of the enricher 268 may be controlled by choosing a designated value for a $CO_2$-concentration in the $CO_2$-lean gas retentate stream 288. The designated value of the $CO_2$-concentration in the $CO_2$-lean gas retentate stream 288 may aid in the design of the membrane in the enricher 268, with dependency on the feed concentrations and the permeation/selectivity properties of the membrane employed. For example, the value of the $CO_2$-concentration in the $CO_2$-lean gas retentate stream 288, for design purposes, may be greater than 10% $CO_2$ when the portion 34 of the pretreated fluid stream 256 to the enricher 268 is greater than 50% for a membrane that has a selectivity of greater than 10 for $CO_2$ relative to Cl. However, this value may be different if the portion 266 of the pretreated fluid stream 256 to the enricher 268 contains only 30% $CO_2$. The $CO_2$-lean gas retentate stream 288 is output as a $CO_2$-lean gas from the enricher 268 of the fluid-capture system 210 to the gas cleanup system 212.

The $CO_2$-lean gas retentate stream 288 is treated in the gas cleanup system 212 to provide a pipeline-quality natural gas stream 286 (e.g. 2% to 5% $CO_2$ and less than 7 lbs/MMSCF $H_2O$). A $CO_2$-selective gas-separation membrane may be used in the gas cleanup system 212 to provide the pipeline-quality natural gas stream 286. In addition, treatment of the $CO_2$-lean gas retentate stream 288 may render a $CO_2$-rich permeate stream 290 having a low amount of $CO_2$ and hence may be flared as a gas 292 via a flare 294, used as a fuel for on-site power generation, or returned to the low pressure gas compressor 248 for further processing.

The storage system 214 includes one or more vessels to store the stream 270 at a designated specification. For example, the storage system 214 may include one or more Quality2 $CO_2$-storage vessels in the $CO_2$-storage system 214. The storage of the intermediate Quality2 $CO_2$-output stream 270 within the storage system 214 provides control of a flowrate of the Quality2 $CO_2$-output stream 270. In some embodiments, the storage pressure and temperature conditions may be different from the pressure and temperature conditions in the condenser 264 of the fluid-capture system 210. In some embodiments, the storage conditions in the storage system 214 may be chosen for optimal storage tank costs and footprint, and energy usage. However, under certain conditions when the process operations in the condenser 264 result in a Quality2 $CO_2$-output stream 270 suitable for reuse, storage of the product in storage vessels and further processing may not be required.

Figure 5:
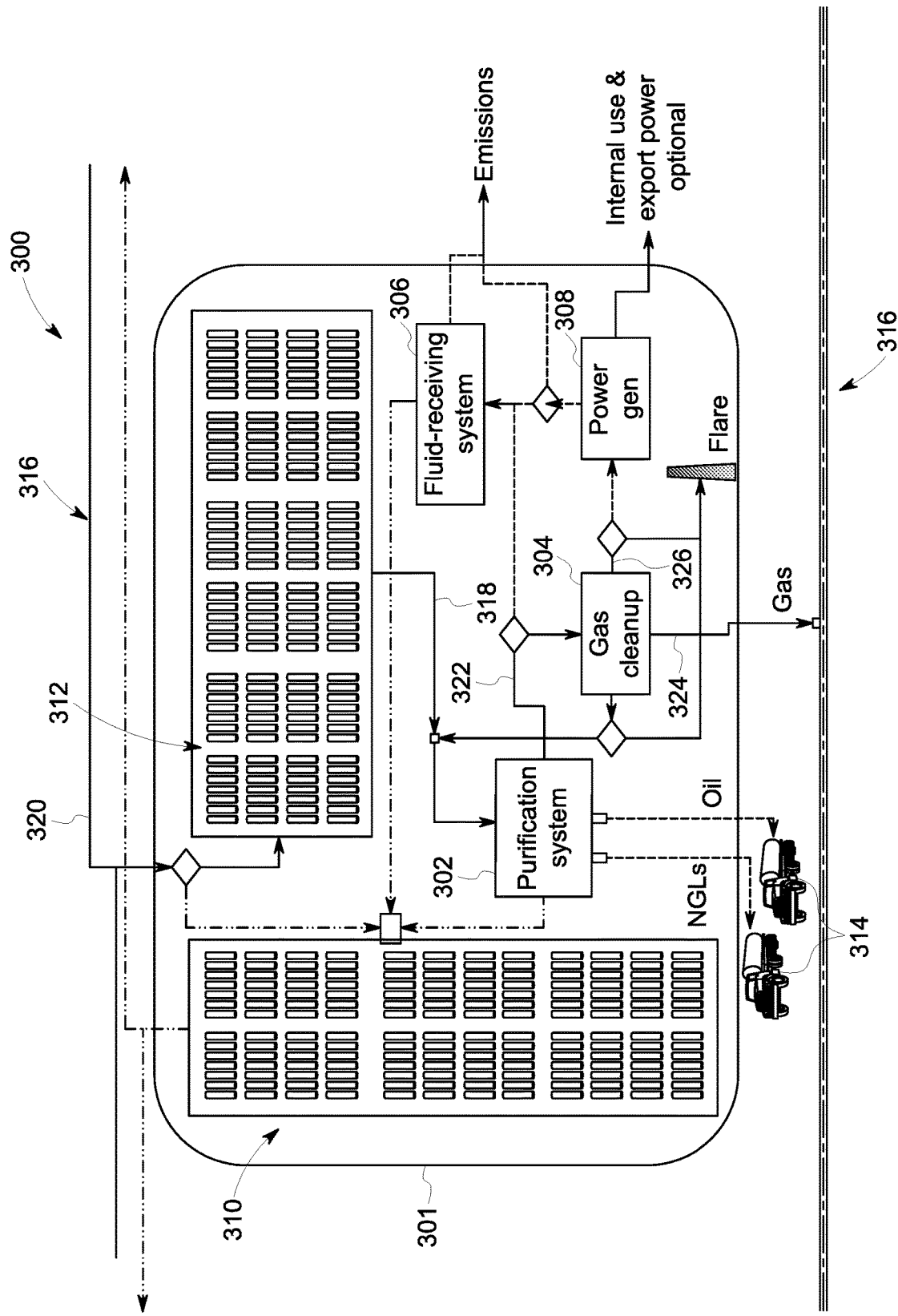
FIG. 5 illustrates a processing facility in accordance with one embodiment that may be used with the system of FIG. 1.

FIG. 5 illustrates a TPF 300 in accordance with one embodiment that may be used with the system 200 (FIG. 2) or the system 100 (FIG. 1). The TPF 300 may include sub-systems that are similar to the system 200, such as a gas cleanup system 304 and/or a fluid-recovery system 306. As such, the description of these sub-systems also applies to the same sub-systems in the TPF 300. These sub-systems, however, may operate at different parameters or may be configured to achieve different target compositions.

As shown in FIG. 5, the TPF 300 includes a purification system 302, the gas cleanup system 304, the fluid-recovery system 306, and a power-generation system 308. The fluid-recovery system 306 is optional. The TPF 300 is located at a processing site 301. The TPF 300 also includes storage vessels 310 and storage vessels 312. The storage vessels 310 are configured to contain a fluid at a designated specification. The storage vessels 312 are also configured to contain a fluid at a designated specification. In particular embodiments, the designated specifications for the storage vessels 310 and the storage vessels 312 are different. For example, the fluid contained within the storage vessels 310 may be stored at a different temperature and/or pressure than the fluid contained within the storage vessels 312.

The fluids stored within the storage vessels 310, 312 may have the same or similar composition. The fluids may have similar compositions with differing levels of quality or purity. For example, the storage vessels 312 may store Quality2 $CO_2$-fluid, and the storage vessels 310 may store Quality1 $CO_2$-fluid. As shown, the storage vessels 310 are configured to receive a fluid (e.g., a stimulating fluid) from the purification system 302. Optionally, the storage vessels 310 may receive a fluid from other sources. The purification system 302 may also be configured to provide the fluid to vehicles 314 or to pipelines 316. The pipelines 316 include a temporary pipeline 316A that is configured to transfer the stimulating fluid to an injection site (not shown), a temporary pipeline 316B that is configured to receive a working fluid from an operating site (not shown), and a pipeline 316C that is configured to transfer NGL. Optionally, the pipeline 316C may be temporary (e.g., disassembled with one or more parts transported to another location for re-assembly) or permanent (e.g., existing prior to the TPF being moved to the processing site 301 and existing after the TPF is moved from the processing site 301).

Flow rates and concentrations of an incoming working fluid 320 that is transferred through the pipeline(s) 316B entering the TPF 300 may vary as a function of source and/or time. For example, if the source of the working fluid is an operating site that is producing a flowback stream after stimulation, the flow rates may decrease significantly as time progresses. As an example, the flowback stream after stimulation with a $CO_2$-fluid may decrease from greater than 700 tons/day to less than 20 tons/day. For sources other than an operating site that produces a flowback stream (e.g. a power plant, a fertilizer manufacturer, refinery, chemical manufacturer, and the like) the flow rate of the incoming working fluid will likely be less than the flow rate of the working fluid 320. The composition of the working fluid may also be different than the composition of the working fluid 320 from the operating site. However, the TPF 300 may optionally include the fluid-recovery system 300, among other subsystems, for processing the working fluid to achieve a target fluid.

Referring to FIG. 5, the purification system 302 is positioned downstream from the storage vessels 312 such that the purification system 302 may receive fluid 318 form the storage vessels 312. For example, the storage vessels 312 may be configured to store Quality2 $CO_2$-fluid. In some embodiments, the purification system 302 executes a distillation process to purify the fluid 318.

By way of example, the working fluid 318 may be a Quality2 $CO_2$-fluid. The purification system 302 may be configured to process the Quality2 $CO_2$-fluid to recover Quality1 $CO_2$-fluid that is suitable for reuse in stimulation and a $CO_2$-lean residual gas. Optionally, the process may include a pretreatment system (not shown), such as the pretreatment system 208, to remove unwanted particles, $H_2S$, etc.

The purification system 302 may include a distillation column. In such embodiments, a designated $CO_2$-fluid may be recovered from a bottom of the distillation column and a volatiles (Cl, $N_2$) may concentrate in the top distillate stream as a residual $CO_2$-lean gas. Purification may be via a $CO_2$-selective gas permeation membrane setup wherein the $CO_2$-rich gas is the permeate gas stream at low pressure that is liquefied (possibly compressed to reduce refrigeration costs). The $CO_2$-lean gas is a high-pressure gas. Purification may involve separation of NGLs from the Quality2 $CO_2$-fluid stream prior to $CO_2$ purification if there is a limit for NGLs in the designated specification for Quality1 $CO_2$-fluid. Such purification may be accomplished by various means. For example, the gas-separation membranes may be selected to impede NGLs permeation and, as such, NGLs may be excluded in the $CO_2$-rich permeate. For example, the Quality2 $CO_2$-fluid stream may be cooled to a sufficiently low temperature to condense out the NGLs without losing significant amounts of $CO_2$.

This $CO_2$-lean gas 322 may be transferred to the gas cleanup system 304 to reduce the $CO_2$-concentration in the $CO_2$-lean gas 322 to achieve a designated composition (e.g., $CO_2$ content being less than 2%). The gas cleanup system 304 may include a gas-permeation membrane that is selective for $CO_2$ such that a retentate stream is a pipeline-quality gas 324. The $CO_2$-rich permeate stream 326 is typically at low pressures, e.g. 5 psig. The $CO_2$-content of the permeate stream 326 may be too low and at low concentrations (e.g., 20-30%) to justify returning the $CO_2$-rich permeate stream 326 to the purification system 302. In such instances, the $CO_2$-rich permeate stream 326 may be flared or used for power generation by the power-generation system 308.

Optionally, the TPF 300 may also include a $CO_2$-generation system to produce $CO_2$ required for stimulation. $CO_2$-production may be achieved through combustion of waste hydrocarbon-containing gases and also natural gas, which may be drawn from the pipeline 316C. The end-product of combustion will contain $CO_2$. The concentration of $CO_2$ in the post-combustion gas stream will depend on a source of oxygen ($O_2$) for combustion. For example, if ambient air is used, then the post-combustion gas may contain greater than 50% $N_2$. If pure $O_2$ is used, then the post-combustion gas would be about 100% $CO_2$ after water removal. Trade-off analysis between the cost of separating $CO_2$ from post-combustion gas and the cost of generating and handling $O_2$ at the TPF 300 may determine whether to generate $CO_2$ at the TPF 300.

Combustion of hydrocarbon-containing substances to yield $CO_2$ generates thermal energy, which can be harvested. Power generated during $CO_2$-production may be used for internal processes (e.g. compressors, refrigeration, etc.). Power may also be exported to other sites (e.g., operating site or injection site). As such, temporary transmission lines (not shown) may be constructed. The temporary transmission lines may extend along the temporary pipelines. High rates of $CO_2$-production may yield more thermal energy and consequently more power generation than required at the TPF 300 and other sites. In this case, the location of the TPF 300 may be selected to be close to an electrical grid so that the power may be added to the electrical grid.

Although the above description of the operating sites and TPFs relate to the recovery of $CO_2$, it should be understood that the operating sites and TPFs may include equipment that recovers the $CO_2$ in other manners and/or equipment that recovers other stimulating fluids. For example, various technologies existed that recover a stimulating fluid. The technologies may be based on, for example, absorption, distillation, adsorption, membrane separation, and hydrates. Nitrogen may be recovered through distillation, use of physical solvents, adsorption, or use of membranes. Equipment may include cryogenic distillation columns, known as nitrogen rejection units (NRUs), nitrotecs, or molecular gates. Equipment for recovering hydrocarbon-containing fluid are also known.

Figure 6:
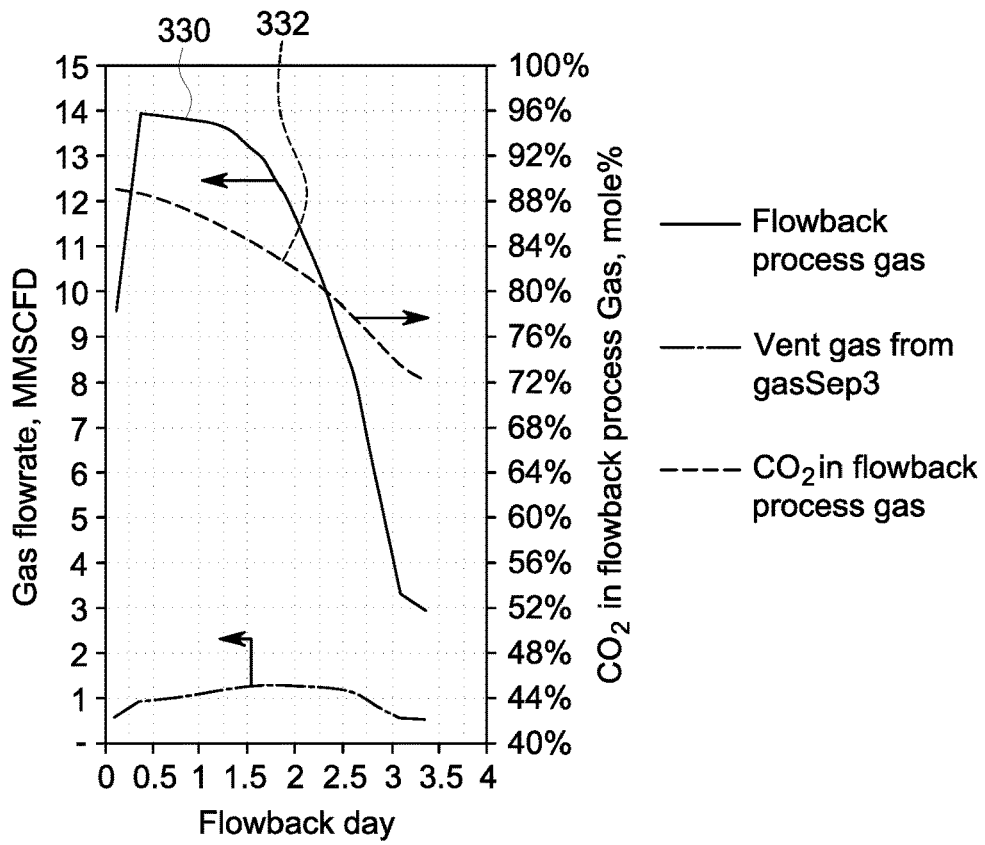
FIG. 6 is a graphical representation illustrating gas flowrates as a function of time.
Figure 7:
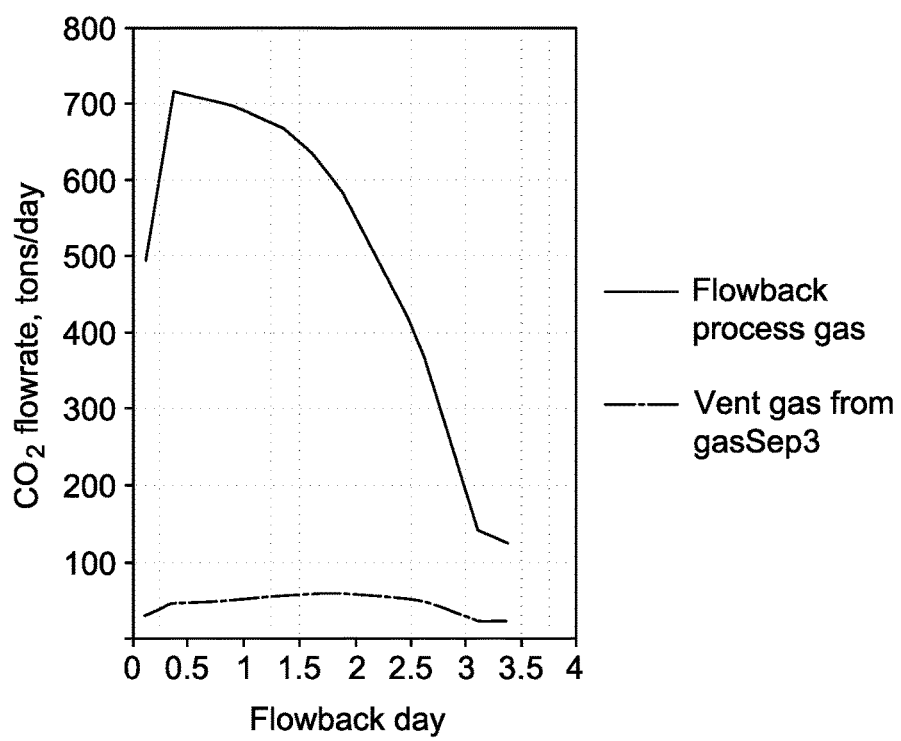
FIG. 7 is a graphical representation illustrating flowrates of a working fluid as a function of time.

FIGS. 6 and 7 are graphical representations illustrating flowrates as a function of time. As described herein, the flowrate and composition of the stimulating fluid (e.g., $CO_2$) in the flowback stream 204 will vary as a function of time. As an example, a flowrate of the flowback stream 204 (as indicated by the solid line 330 in FIG. 6) varies from a maximum of approximately 14 MMSCFD to as low as 3 MMSCFD over a 3.5 day period. During this time period, a $CO_2$-concentration (as indicated by dashed line 332) in the flowback stream 204 changed from approximately 90% to approximately 70%. Despite the significant changes in flowrates and $CO_2$-concentration, the output fluid stream 250 may be substantially consistent, such as between 0.5 and 1.5 MMSCFD. It is noted that units of measurements disclosed herein may be converted to other units of measurements.

The opposite pointing arrows in FIG. 6 indicate that there is a dynamic component to the rate profile that is greatly affected by flowback crew operations associated with the $CO_2$-capture steps, such as millout, cleanout, production tubing install or simply stoppages/restarts or due to the well output itself. Also, it is noted that the flowback gas compositions and flowrates may vary significantly from well-to-well depending on the well characteristics and the flowback crew operation philosophy.

Figure 8:
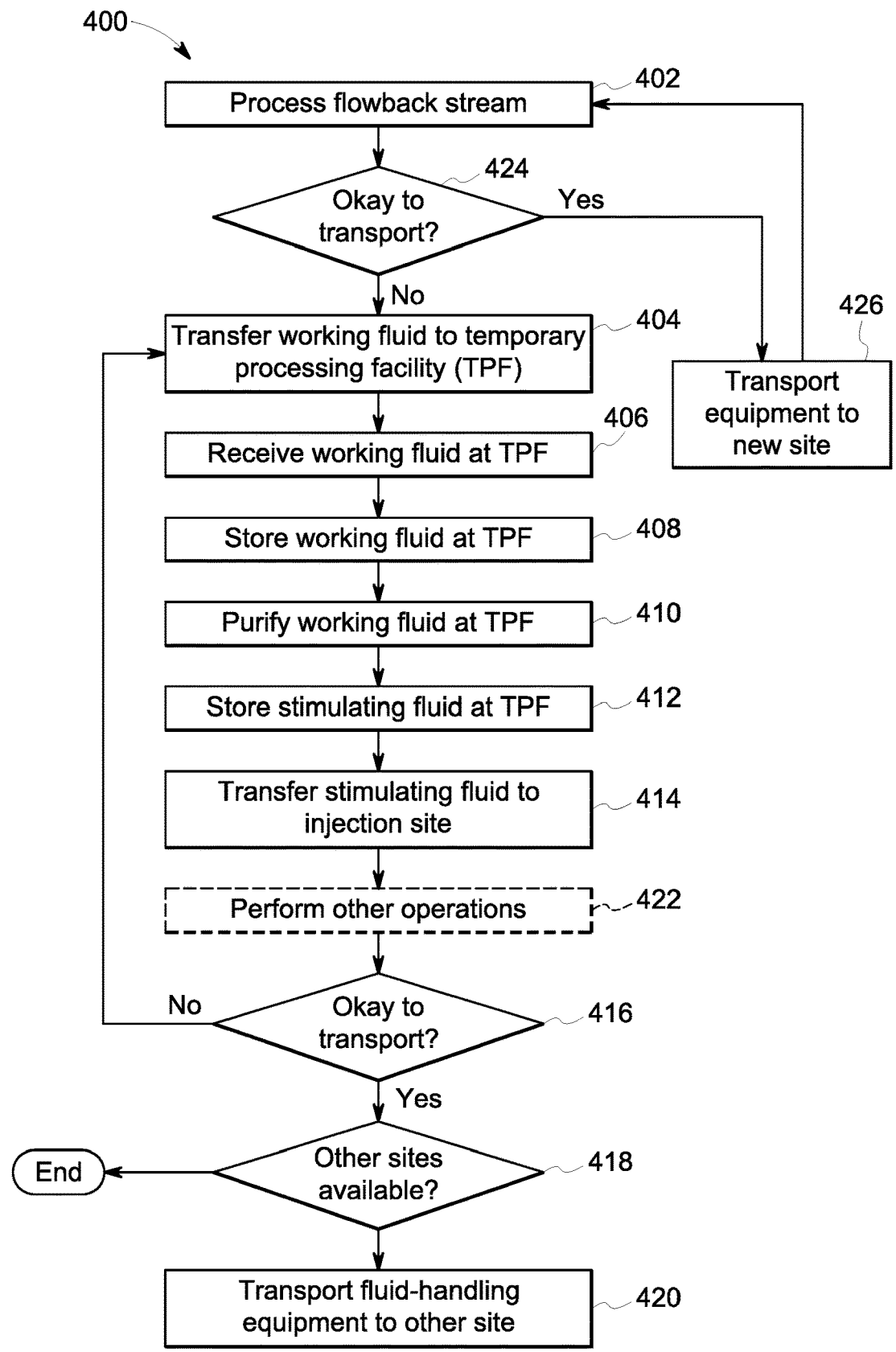
FIG. 8 is a flow chart illustrating a method in accordance with an embodiment.

FIG. 8 is a flowchart illustrating a method 400 in accordance with an embodiment. The method 400 may be, for example, a method for managing recovery of a stimulating fluid from a flowback stream and managing re-use of the stimulating fluid. The method 400 may include conducting a campaign for extracting a resource fluid from a subterranean reservoir. This method 400 may include using and re-using a stimulating fluid that is recovered from a flowback stream. The method 400 may include using, for example, the system 100 and/or the system 200 and/or the TPF 300. It should be understood that, in some embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 400 includes processing, at 402, a flowback stream at an operating site to provide a working fluid that includes a stimulating fluid. The flowback stream is generated by a post-stimulated well that was injected with the stimulating fluid. The operating site may be one of a plurality of sites within a geographical region (e.g., a region having an area less than 10,000 km$^2$, or less than 5,000 km$^2$, or less than 2,000 km$^2$, or less than 1,000 km$^2$, or less than 500 km$^2$). The area may be at least 10 km$^2$, at least 50 km$^2$, at least 100 km$^2$, or at least 250 km$^2$.

For example, the processing, at 402, may include separating unwanted solid matter from the flowback stream. The unwanted solid matter may include particles obtained during millout of plugs. The processing, at 402, may also include controlling a flowrate of the flowback stream. The flowrate may be controlled by using, for example, a choke valve. The processing, at 402, may also include separating a portion of the working fluid from other components, such as hydrocarbon-containing liquid (e.g., oil), water, and sand. The processing, at 402, may also include compressing a working fluid so that the working fluid has a designated pressure.

In some embodiments, a system may determine instructions that specify controlling one or more of the processing steps at 402. For example, the instructions may control a flowrate of the flowback stream or the working fluid or a pressure of the working fluid. The instructions may include decreasing an output of the working fluid from the operating site, changing a percentage of the working fluid that is diverted directly to a gas pipeline at the operating site, or decreasing an output of the stimulating fluid from the TPF or other processing facility. The instructions may also include instructions to store the working fluid or to transfer the working fluid. The various processing steps may be modified to achieve a designated composition of the working fluid.

The processing of the flowback stream, at 402, may continue until it has been determined, at 424, that the equipment should be transported to a new operating site. For example, this determination may be based on at least one of a flowrate of the flowback stream; a concentration of the stimulating fluid within the flowback stream; or an elapsed time period after when the flowback stream began flowing at the operating site. After it is determined to transport the equipment, the equipment at the operating site may be transported, at 426, to a new operating site if one exists. As described herein, the decision to transport equipment at 416 or at 424 may be based upon whether a designated condition has been satisfied.

At 404, the working fluid from the operating site is transferred to a current TPF that is located in the geographical region and located remotely with respect to the operating site. The working fluid may be a lower-quality or lower-purity fluid of the stimulating fluid. The phrase "located remotely with respect to" and like phrases include the sites being separate sites. For instance, the two sites that are located remotely with respect to each other may be separated by a non-cleared area of land or separated by other sites. As an example, an operating site and an injection site may be separated by at least 1 km. As another example, an operating site and a TPF may be separated by at least 0.2 km. A distance between two sites is measured as the shortest distance between a piece of fluid-handling equipment at one site and a piece of fluid-handling equipment at the other site.

The working fluid may be transferred, at 404, through a pipeline (e.g., temporary pipeline or permanent pipeline) or may be transferred using one or more vehicles, such as a truck or train. In some embodiments, a system may determine instructions that specify how the working fluid is to be transferred to the TPF or other locations. For example, the instructions may specific a flow rate or a total volume that must be achieved within a designated time period. The instructions may also specify the mode of transferring (e.g., pipeline and/or vehicle).

The working fluid is received, at 406, at the current TPF. Optionally, the working fluid may be stored, at 408, within one or more storage vessels. The storage vessels may hold the working fluid at a designated specification. Optionally, the working fluid is received, at 406, by a purification system. The working fluid is purified, at 410, at the current TPF, thereby providing the stimulating fluid. Purifying, at 410, may include using a distillation column. After purification, the stimulating fluid may be stored, at 412, in accordance with a designated specification.

The method also include transferring, at 414, the stimulating fluid from the current TPF to an injection site that is located remotely with respect to the current TPF and the operating site. Again, the transferring may be performed by flowing the stimulating fluid through a pipeline and/or using one or more vehicles to deliver the stimulating fluid.

At 416, it is queried whether equipment should be transported to another site. For example, the equipment may be transported if one or more designated conditions have been satisfied. If the equipment should not be transported, the method 400 continues operating as described above to process the flowback stream and recover the stimulating fluid. If the equipment should be transported, it is queried, at 418, whether other sites exist in the campaign schedule. If other sites exist in the campaign schedule, the method 400 proceeds to transporting, at 420, fluid-handling equipment. By way of example, equipment may be moved to a new TPF if a sufficient volume of stimulating fluid has been transferred to the injection site and/or if the operating site is capable of handling the flowback stream without directing working fluid to the TPF.

The fluid-handling equipment may be transported from the operating site to another site (e.g., a new operating site or a new TPF). Alternatively or in addition to the above, the fluid-handling equipment may be transported from the TPF to another site (e.g., a new operating site or a new TPF). The fluid-handling equipment may be fluid-processing equipment that is configured for processing the flowback stream to recover the stimulating fluid. For example, fluid-processing equipment may remove unwanted material from a material, add material to the fluid, or change a property (e.g., temperature, pressure, flowrate) of the fluid. The fluid-handling equipment may also include equipment that is configured to store the fluid (e.g., vessels or tanks) at a designated specification or equipment that is configured to transfer the fluid (e.g., sections of pipeline). The flowback stream may continue to be received at the operating site even after the designated condition has been satisfied and the fluid-handling equipment has been removed.

The fluid-handling equipment is transported after a designated condition has been satisfied. Satisfaction may be determined by an individual and/or a system including one or more processors. The designated condition for transporting equipment from the TPF may be, for example, a function of how much stimulating fluid is required by the injection site (or injection sites) in order to stimulate the well(s). As such, the designated condition may be satisfied when it is determined that the injection site (or sites) has a sufficient volume of the stimulating fluid or will have a sufficient volume of the stimulating fluid after receiving the stimulating fluid that is in transit to injection site (or sites).

Alternatively or in addition to the above, the designated condition may be a function of at least one of a flowrate of the flowback stream at the operating site or an elapsed time period after the flowback stream begins flowing at the operating site. For example, it may be determined (e.g., calculated by a system) that when the flowrate decreases to a designated value, then the fluid-handling equipment should be disconnected and transported to another location. As another example, it may be determined that when the flowback stream has a stimulating-fluid concentration and/or stimulating-fluid content at or below a designated value, then the fluid-handling equipment should be disconnected and transported to another location. In some embodiments, the designated condition may be an elapsed time period from when the flowback stream began to flow. The designated condition may be an elapsed time period that is a function of the flowrate throughout the flowback period. For example, if the flowrate is high during the flowback period, the elapsed time period may be decreased. If the flowrate is low during the flowback period, the elapsed time period may be increased.

Satisfaction of the designated condition may be determined using a multi-variable function, such as an objective function, cost function, profit function, and the like. The multi-variable function may be solved using one or more processors. The multi-variable function may include a plurality of variables in which the multi-variable function is analyzed to identify values of the variables that provide a desired outcome (e.g., the best outcome). The multi-variable function may be used to improve one or more metrics-of-interest. The metrics-of-interest may be the variables in the multi-variable function. By way of examples, the best outcome may be the outcome that is the most profitable or generates the most revenue for an enterprise. The best outcome may also be the outcome in which the campaign is finished in the least amount of time. The best outcome may also be the outcome in which the campaign is extended for a designated period of time. Such instances may occur when the price of a resource fluid has changed.

The variables (or metrics) that may be used in the multi-variable function may include, for example, a present flow-rate of the flowback stream, a range of flowrates that may be set for the flowback stream by controlling fluid-handling equipment at the operating site (e.g., choke valve), incoming volumes of the working fluid expected at the TPF, a composition of the working fluid expected at the TPF, a flowrate of the working fluid expected at the TPF, outgoing volumes of the stimulating fluid requested for the injection site, a composition of the stimulating fluid expected at the injection site, a flowrate of the stimulating fluid expected at the injection site, current levels or volumes of the stimulating fluid at the TPF, volume of the stimulating fluid that has already been injected at the injection site, cost of labor for disassembling and/or assembling pipeline, cost of materials for assembling pipeline, production of the resource fluid, impacts to commodity supply, operational constraints, and cash flow. A metric may be limited by a certain time period or other constraint. For example, a multi-variable function may be used to identify a campaign schedule that provides an improved NPV for the next six months while avoiding certain sites or wellpads. It should be understood that other possible metrics than those described above are contemplated.

It should also be understood that the phrase "improve a metric-of-interest" does not necessarily mean maximize. It may be desirable to minimize values of one or more metrics or achieve a value of the metric that is closest to a target value. The phrase also does not exclude the possibility that other metrics-of-interest may be improved. For example, a multi-variable function may be used to identify a campaign schedule that improves cash flow and a total production of the resource fluid while using the least number of different sites for the TPFs.

The method 400 may be repeated a plurality of times throughout the campaign in which the new TPF becomes the current TPF for the next iteration of the method 400. As such, a single campaign may include, repeating a plurality of times, recovering the stimulating fluid during a flowback period at an operating site and injecting the stimulating fluid into a well at an injection site.

In some embodiments, the campaign may be configured such that the fluid-handling equipment is used substantially continuously for at least a designated time period. For example, the campaign may be configured such that the fluid-handling equipment is used substantially continuously for at least one month. As used herein, the phrase "substantially continuously for at least a [designated time period]" includes the possibility that the fluid-handling equipment may be inactive for short periods of time while the fluid-handling equipment is being transported or while the operating site (or TPF) is being constructed and waiting to go online.

As an example, fluid-handling equipment may be used substantially continuously for at least a designated time period, if the fluid-handling equipment is actively online for at least 80% of the designated time period or, more specifically, at least 90% of the designated time period. This designated time period does not include time in which the equipment is inactive due to need of repair (e.g., broken or incapable of operating at a sufficient level). The term "actively online" means that the fluid-handling equipment is in flow communication with other equipment at the site and available for use in processing the fluid.

As another example, the phrase "substantially continuously for at least a [designated time period]" may include the fluid-handling equipment being used at three or more different sites per month. In more particular embodiments, the phrase "substantially continuously for at least a [designated time period]" includes the fluid-handling equipment being used at four or more different sites per month. The sites may be TPFs or operating sites that receive the flowback stream.

The fluid-handling equipment may include equipment that is used in the process of recovering the stimulating fluid from the flowback stream at the operating site or any fluid-handling equipment at the TPF. The fluid-handling equipment may include, for example, an enricher that is configured to increase the stimulating fluid within the working fluid and a condenser that is configured to condense the working fluid. In some embodiments, the fluid-handling equipment includes the equipment that is necessary for processing the flowback stream at the operating site during the flowback period or any equipment that is necessary for the TPF to operate.

The method 400 may also include performing, at 422, one or more other operations at the TPF. For example, the method 400 may include recovering, at 422, natural gas liquid from the working fluid at the current TPF. Alternatively or in addition to the above, the method 400 may include generating, at 422, power by combusting hydrocarbon-containing fluid. Alternatively or in addition to the above, the method 400 may include generating, at 422, $CO_2$ at the TPF.

With respect to the method 400, it should be understood that the stages or operations of the method (e.g., 402, 404, 406, 408, 410, 412, 414, and 422) are not required to occur separately and may often occur concurrently. For example, as fluid is being processed at 402, other fluid may be transferred at 404, and other fluid may be purified at 410, and other fluid may be transferred at 414.

As described herein, the method 400 may be implemented with more than one operating site and/or more than one injection site. In such instances, the decision to transport equipment at 416 may be based upon particular sites or a combination of sites. As one example, the equipment of the TPF may be transported only after it is determined that a sufficient volume of stimulating fluid has been transferred from the TPF to each of the injection sites and that each of the operating sites is capable of handling the flowback stream without transferring working fluid to the TPF.

Figure 9:
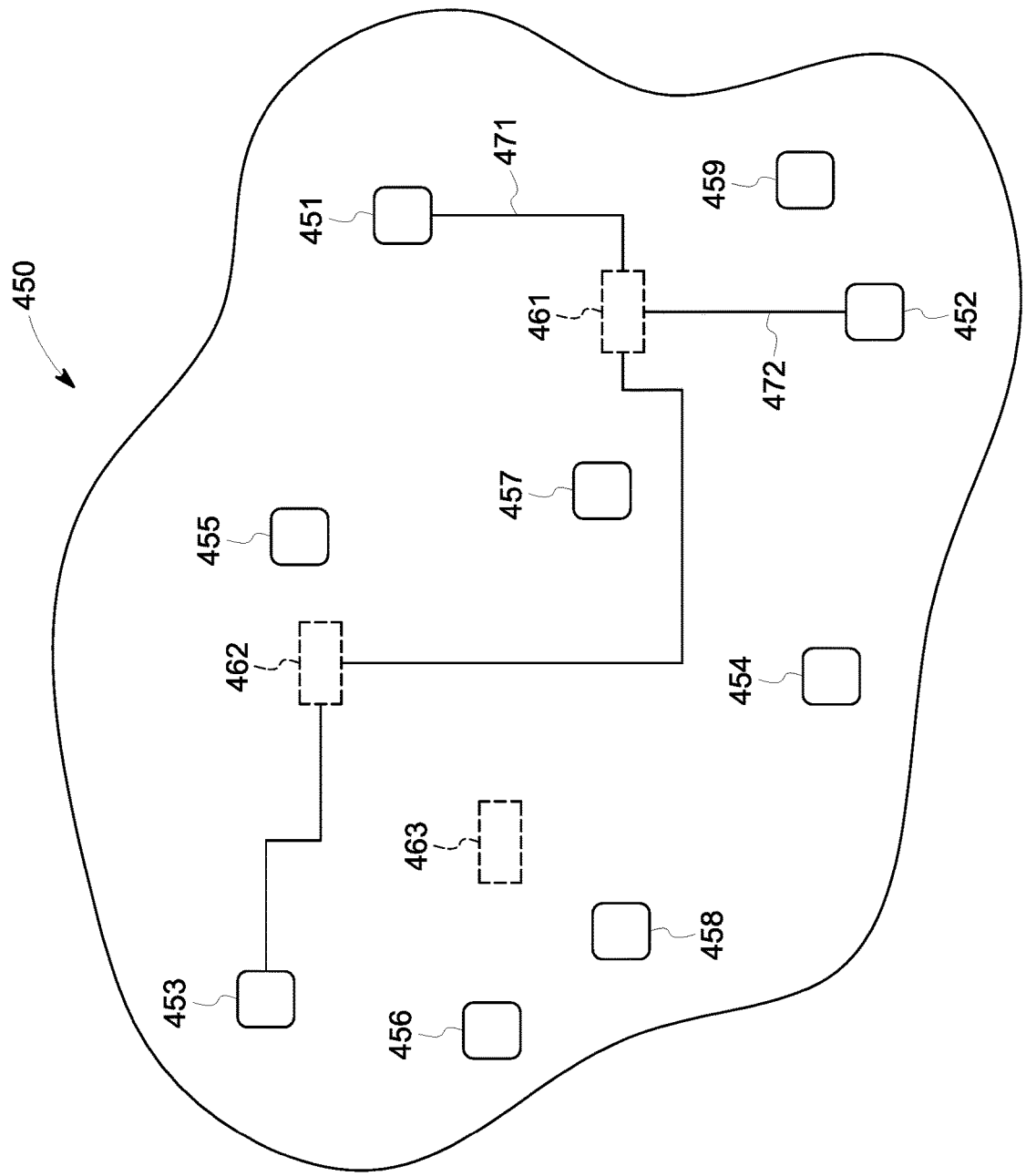
FIG. 9 illustrates a geographical region having multiple extraction sites from which a fluid may be extracted and multiple temporary sites where a processing facility may be constructed.

FIG. 9 illustrates a geographical region 450 having multiple sites 451-459 from which a resource fluid may be extracted. The geographical region 450 also includes multiple temporary processing sites 461-463 where respective TPFs may be constructed. Embodiments may be configured to identify locations for the TPFs. Embodiments may also be configured to generate a campaign schedule that identifies when to inject the sites with a stimulating fluid and when to recover the stimulating fluid from the sites. For example, embodiments may use a multi-variable function to identify a desired outcome for the campaign. The schedule may also identify which sites to fluidly connect through a temporary pipeline and when to assemble temporary pipeline. As such, a sustained campaign may be conducted in which fluid-handling equipment may be used substantially continuously for at least a designated time period.

Each of the sites 451-459 is a well-pad having a plurality of wells thereon. After injecting a first site with a stimulating fluid, it may be desirable that the next site (second site) for stimulation be at least a predetermined distance away from the first site that was recently injected with the stimulating fluid. In determining the campaign schedule, a cost of deconstructing (or disassembling) a temporary pipeline and a cost of constructing (or assembling) a new temporary pipeline may be considered. The cost of constructing or deconstructing a pipeline is a function of, for example, a cost of labor for constructing the pipeline and a cost of materials for constructing the pipeline. Shorter pipelines may be less costly because the shorter pipelines can be constructed more quickly and may require less material. As such, the campaign schedule may be based on countervailing factors.

Embodiments may be configured to analyze the locations of the sites within the geographical region to determine a campaign schedule. Optionally, embodiments may identify the locations where a TPF will be constructed. The campaign schedule may include an order in which the sites will be stimulated and the order in which the different TPFs will be used. For example, the first injection site may be site 451. After injecting the stimulating fluid into the site 451, the wells of the site 451 are closed. The second injection site that is scheduled for stimulation may be site 452. As shown, the sites 451 and 452 are in flow communication through a first TPF 461. Temporary pipelines 471, 472 exist between the sites 451, 452, respectively, and the TPF 461. After a designated time period, at least one of the wells of the site 451 is opened and a flowback stream is produced. About this time, the wells of the site 452 may be injected with the stimulating fluid.

As described above, the flowback stream at the site 451 may be processed and a lower-quality stimulating fluid may be transferred to the TPF 461. The lower-quality stimulating fluid may be purified at the TPF 461 to provide the stimulating fluid. In some embodiments, the stimulating fluid may be generated at the TPF 461 and/or the stimulating fluid may be delivered to the TPF 461 from other sources as the lower-quality stimulating fluid is purified at the TPF 461. As the stimulating fluid at the site 452 is injected into the wells, it may be necessary to replenish the stores of the stimulating fluid at the site 452. Embodiments may manage transferring the stimulating fluid from the TPF 461 to the site 452 so that a sufficient volume of stimulating fluid is available for injecting into the wells of the site 452. As described above, the flowback stream and the volume of fluid injected into the wells can be large.

After a predetermined condition is satisfied, the fluid-handling equipment at the TPF 461 and/or at the site 451 may be moved to a new site. For example, after the flowrate of the flowback stream decreases to or below a designated value, the fluid-handling equipment at the site 451 may be disconnected and delivered to a new site, such as the site 453. After the working fluid from the site 451 stops arriving at the TPF 461, the fluid-handling equipment at the TPF 461 may be disconnected and delivered to a new site, such as the TPF 462.

The fluid-handling equipment is constructed at 453, and the TPF 462 is constructed at a new location. After some time, the site 452 becomes the operating site that provides working fluid to the TPF 462, which processes the working fluid to provide the stimulating fluid to the site 453. This process may be repeated a plurality of times until all designated sites within the geographical region have been stimulated and a flowback stream has been received therefrom.

Figure 10:
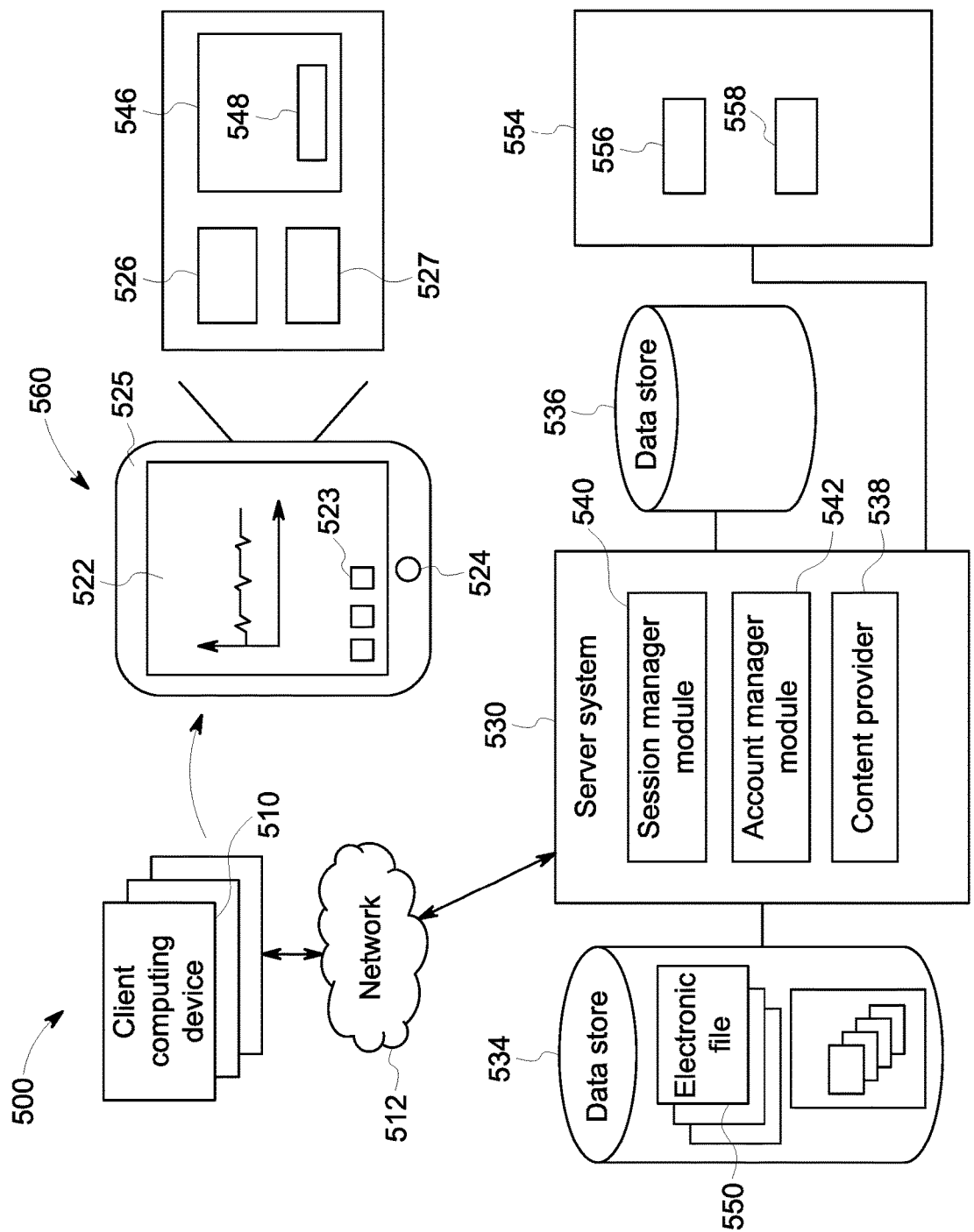
FIG. 10 illustrates a block diagram of an exemplary system in accordance with an embodiment.

FIG. 10 is a block diagram of an exemplary system 500 in accordance with an embodiment. The system 500 may be configured to execute one or more steps of the method 400. The system 500 includes one or more client computing devices 510 that are capable of communicating over a network 512 with a server system 530. Individuals may be capable of providing user inputs (e.g., flowrate data, volume of stimulating fluid need for injection) into the system 500 using the client computing devices 510. The user inputs may be used by the system 500 to generate instructions to the individuals in order to achieve a desired outcome during a campaign. In some embodiments, data may be automatically provided to the system 500 through sensors, transducers, monitors, or the like. Optionally, the system 500 may include the sensors, transducers, monitors, or the like.

The server system 530 may include one or more web servers and, optionally, one or more application servers. The server system 530 may host a web application and have the tools, application program interfaces (APIs), and scripts, among other things, that may be used for the web application. In some embodiments, a web application includes a web site or web page that allows a user to view waveform data. The server system 530 may be only a single server or include a plurality of different servers that communicate with one another and the client computing devices 510 over the network 512. The server system 530, in some embodiments, is configured to receive and interpret requests through the network 512 from the client computing devices 510 or, more specifically, from software applications 546 of the client computing devices 510. The server system 530 is also configured to respond to the requests and transmit data to the client computing devices 510 in a predetermined format (e.g., HTML format). In some cases, the server system 530 and the client computing devices 510 may form a cloud-type computing system (e.g., public cloud, private cloud, or hybrid cloud).

The network 512 represents any one or combination of multiple different types of networks, such as cable networks, the Internet, private intranets, local area networks, wide area networks, wireless networks, and the like. In particular embodiments, the network 512 is the network of an enterprise (e.g., business) that allows access to authorized users for communicating confidential information for receiving work schedules.

The client computing devices 510 may be implemented as any number of types of computing devices. These devices may include, for instance, personal computers (PCs), tablet computers, notebook computers, laptop computers, smart phones, electronic book readers, and so forth. In particular embodiments, the client computing devices 510 may include portable or handheld devices, such as tablet computers, notebook computers, laptop computers, and smart phones (e.g., iPhones).

The client computing devices 510 may also be configured to operate application programs, such as web browsers, mobile applications, or other software programs. The application program may be, for example, a third-party program (e.g., Google Chrome), a third-party mobile application (which may or may not include the same functionalities as a conventional web browser), or an application program configured for the enterprise using the application program. For instance, the application program may be developed using WebView. The communication network may include a private network, public network, or both. Non-limiting examples of web browsers include, such as Microsoft's Internet Explorer, Google Chrome, Mozilla Firefox, Opera, and Apple's Safari. The application programs may also be similar to mobile applications (referred to as "apps"). Optionally, the application programs may be configured to work with sub-applications or scripts (e.g., plug-ins or extensions) that are executed from within the application program or in concert with the application program. The sub-application runs or is executed concurrently with the application program. Optionally, the sub-application may be stored within the client computing system and/or the server system.

Application programs may be third-party software that retrieve, present, and communicate information through the network. Application programs are configured to communicate with the server system 530 over the network 512. The application programs may communicate using, for example, a known protocol (e.g., Hypertext Transfer Protocol (HTTP) or HTTP-secure (HTTPS)). More specifically, the application programs may send requests (e.g., HTTP requests) for information to any web-accessible internet address. The application programs may also display the information in accordance with a predetermined format (e.g., HTML format). The sub-applications may be launched from within the application program and, optionally, communicate with the server system 530 to retrieve information that may be displayed to the user through the application program. Embodiments set forth herein may be implemented, at least in part, using an application program, a sub-application associated with the application program, or other software program having computer executable code.

In some embodiments, the server system 530 is configured to present a digital page (e.g., website) that is capable of handling requests from one or more users and transmitting, in response, various digital pages that are rendered at the client computing devices 510. For instance, the digital page can be any type of website that allows a user to view schedules, graphs, etc. and, optionally, enter user inputs. User inputs may include data and/or instructions that are necessary for carrying one or more methods, such as the method 400. In another example, the server system 530 may provide applications or sub-applications for the client computing devices 510 to download, store, and run locally. The server system 530 may additionally or alternatively interact with the client computing devices 510 to provide content in other ways.

As one example, the server system 530 may present an institutional digital page (e.g., an interactive display, such as a website) that allows access to data for a user that is authorized to view the data. The server system 530 may include, among other things, a content provider module 538, a session manager module 540, and an account manager module 542. The modules 538, 540 and 542, as well as other modules or services described herein, may be implemented by one or more processors performing program instructions to perform the operations described herein. The program instructions may be stored in data stores 534 or 536. The server system 530 interacts with one or more memories or data stores 534 and 536 in various manners. One or both of the memories or data stores 534 and 536 may store program instructions to direct one or more processors to carry out the instructions described herein.

The data stores 534, 536 (as well as memory at the client computing devices 510) may also store various information, such as account-specific information about users of the site. The data store 534 may also store one or more catalogs related to items that may be viewed by the user. For example, web content (text, videos, pictures, and other content) may be stored therein. Content may also include electronic files 550 (e.g., schedules, reservoir data, reservoir extraction parameters, fluid-handling parameters, etc.). The data associated with different web content may be transmitted to client computing devices 510 in response to individual client request designating location of such web content. It is recognized that the various content may be stored at locations distributed between various data storage areas, geographic locations, file structures, recommendation services, e-commerce catalogs, and the like.

During operation, the session manager module 540 maintains network sessions with one or more client computing devices 510, which may be associated with the same enterprise or multiple different enterprises. The session manager module 540 responds to requests from the client computing devices 510 by providing authenticated and unauthenticated network resources. The session manager module 540 reviews incoming requests and determines whether the incoming requests seek access to authenticated or unauthenticated network resources. Requests for an authenticated network resource involve (e.g., require) privilege authentication before the session manager module 540 responds by granting access to the authenticated network resource. When privilege authentication is warranted/needed, the account manager module 542, returns an account lookup response including a prompt for non-sign-in credentials. The non-sign-in credentials corresponding to a type of content maintained in connection with user accounts. The non-sign-in credentials represent user specific information that is unique to a user and is not used as sign-in credentials for a corresponding network service. Optionally, the account manager module 542 may return an account authentication page including at least one of i) a sign-in credential fields or ii) a create new account option. Based on the user's entries at the account authentication page (as explained herein), the account manager module 542 presents an account lookup response (e.g., when incorrect sign-in credentials are entered). The account manager module 542 may authorize the user to view or enter schedules, reservoir data, parameters, and/or other information.

Also shown in FIG. 10, a computer 560 (e.g., tablet computer, but other computers may be used) that includes a user display 522, which may be a touchscreen in some embodiments that is configured to identify and locate a touch from a user's finger or stylus. The user display 522 is framed by a housing 525 of the computer 560. The user display 522 defines an area that may present virtual user-selectable elements 523 that may be selected by the user on the user display 522. Alternatively or in addition to the user-selectable elements 523, a user may select tangible or physical user-selectable elements 524 (e.g., buttons, switches, and the like).

Also shown in FIG. 10, the computer 560 may include one or more processors 526 and computer-readable storage media 527. The computer-readable storage media 527 may store program instructions or computer code for a display application 546. In some embodiments, the computer-readable storage media 527 may store programmed instructions or computer code for a sub-application 548. Optionally, the sub-application 548 may be a plug-in or extension that is executable within or by the display application 546.

The system 500 also includes a schedule generator 554 that is configured to generate schedules for one or more client enterprises. In some embodiments, the schedule generator 554 may also be referred to as a control system. As shown, the schedule generator 554 includes one or more processors 556 (e.g., microprocessors, field programmable gate arrays, application specific integrated circuits, multi-core processors, or other electronic circuitry or logic-based devices that carry out instructions of a computer program by carrying out arithmetic, logical, control, and/or input/output operations specified by the instructions) and a tangible and non-transitory computer readable storage medium 558. The tangible and non-transitory computer readable storage medium 558 may include one or more programmed instructions or may include one or more software modules configured to direct the one or more processors 556. The one or more processors 556 may be configured to execute the programmed instructions and perform one or more of the operations and/or steps of the methods set forth herein (e.g., the method 400).

To illustrate an example, the schedule generator 554 may obtain an outgoing volume of stimulating fluid from a client computing device 510 and an incoming volume of working fluid from the same client computing device 510 or a different client computing device 510. In some embodiments, one or more of the client computing devices 510 are operated by an individual (e.g., human). In other embodiments, one or more of the client computing devices 510 are at least partially automated for entering data and/or parameters.

Although the above example illustrates certain operations being performed by the client computing device 510 and certain operations being performed by the schedule generator 554, it should be understood that other operations may be performed by the client computing device 510 and the schedule generator 554 or that the client computing device 510 and the schedule generator 554 perform different operations. For example, the schedule generator 554 may perform all of the operations. Alternatively, the client computing devices 510 may perform all of the operations.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. For example, a module or system may include a computer processor, controller, or other logic-based device that performs operations based on instructions stored on a tangible and non-transitory computer readable storage medium, such as a computer memory. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A computer-implemented method for optimizing the operation of a current temporary processing facility (TPF) that is configured to manage the recovery of a stimulating fluid from a flowback stream, the method comprising the steps of:
   analyzing locations of sites that include an operating site and an injection site;
   determining the location of the current TPF, the location of the current TPF being determined, at least in part, based on an estimated outlay for transferring a working fluid from the operating site to the current TPF;
   transferring the stimulating fluid from the current TPF to the injection site;
   determining an outgoing volume of a stimulating fluid for transfer from the current TPF to at least one other location, the at least one other location including the injection site having one or more wells configured to receive an injection of the stimulating fluid;
   determining an incoming volume of a working fluid to the current TPF, the working fluid being transferred, at least in part, from the operating site having a post-stimulated well injected with the stimulating fluid, the working fluid from the operating site being derived from a flowback stream from the post-stimulated well of the operating site;
   generating operating instructions, based on the outgoing and incoming volumes, the operating instructions including at least one of (a) process instructions for controlling fluid-handling equipment at the current TPF to recover the stimulating fluid; (b) transfer instructions for transferring the stimulating fluid from the current TPF to the injection site; or (c) transport instructions for transporting storage equipment at the current TPF to a new TPF; and
   implementing the operating instructions to optimize the operation of the current TPF.

2. The method of claim 1, wherein the operating instructions are also based on a composition of the working fluid from the operating site.

3. The method of claim 1, wherein the operating instructions include instructions for combusting hydrocarbon-containing gases at the current TPF to generate at least one of electrical power or the stimulating fluid.

4. The method of claim 1, wherein the operating instructions include instructions for disassembling a temporary pipeline that fluidly connects the current TPF and the operating site.

5. The method of claim 1, wherein the operating instructions are based on the flowrate of the flowback stream at the operating site.

6. The method of claim 1, wherein the location of the current TPF is further determined, at least in part, based on an estimated outlay for constructing a temporary pipeline for transferring the working fluid from the operating site to the current TPF.

7. A computer-implemented method for optimizing the operation of a current temporary processing facility (TPF) that is configured to manage the recovery of a stimulating fluid from a flowback stream, the method comprising the steps of:
   analyzing locations of sites that include the TPF, an operating site, and an injection site;
   based on the locations of the sites, determining a campaign schedule that identifies an order in which the sites will be stimulated and at least one location for the current TPF;
   determining an outgoing volume of a stimulating fluid for transfer from the current TPF to at least one other location, the at least one other location including the injection site having one or more wells configured to receive an injection of the stimulating fluid;
   determining an incoming volume of a working fluid to the current TPF, the working fluid being transferred, at least in part, from the operating site having a post-stimulated well injected with the stimulating fluid, the working fluid from the operating site being derived from a flowback stream from the post-stimulated well of the operating site;
   generating operating instructions, based on the outgoing and incoming volumes, the operating instructions including at least one of (a) process instructions for controlling fluid-handling equipment at the current TPF to recover the stimulating fluid; (b) transfer instructions for transferring the stimulating fluid from the current TPF to the injection site; or (c) transport instructions for transporting storage equipment at the current TPF to a new TPF; and
   implementing the operating instructions to optimize the operation of the current TPF.

* * * * *